US012691875B2

(12) United States Patent
Iba et al.

(10) Patent No.: US 12,691,875 B2
(45) Date of Patent: Jul. 28, 2026

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventors: Tatsuya Iba, Hitachinaka (JP); Kentaro Ueno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 174 days.

(21) Appl. No.: 18/692,574

(22) PCT Filed: Aug. 10, 2022

(86) PCT No.: PCT/JP2022/030518
§ 371 (c)(1),
(2) Date: Mar. 15, 2024

(87) PCT Pub. No.: WO2023/067879
PCT Pub. Date: Apr. 27, 2023

(65) Prior Publication Data
US 2024/0375648 A1      Nov. 14, 2024

(30) Foreign Application Priority Data
Oct. 20, 2021     (JP) ................................. 2021-171622

(51) Int. Cl.
*B60W 30/10* (2006.01)

(52) U.S. Cl.
CPC ......... *B60W 30/10* (2013.01); *B60W 2510/20* (2013.01); *B60W 2520/10* (2013.01);
(Continued)

(58) Field of Classification Search
CPC .. B60W 30/0956; B60W 30/10; B60W 30/16; B60W 40/06; B60W 60/0011;
(Continued)

(56) References Cited

U.S. PATENT DOCUMENTS 6,141,617 A      10/2000  Matsuda et al.
11,167,753 B2 *  11/2021  Ishioka ............. B60W 50/0097
(Continued)

FOREIGN PATENT DOCUMENTS

JP      2014-151758 A      8/2014
JP      2017-117079 A      6/2017
(Continued)

OTHER PUBLICATIONS

International Preliminary Report on Patentability (PCT/IB/326, PCT/IB/338 & PCT/IB/373) issued in PCT Application No. PCT/JP2022/030518 dated May 2, 2024, including Japanese-language Written Opinion (PCT/ISA/237), with English translation (10 pages).
(Continued)

*Primary Examiner* — Andrew Joseph Rudy
(74) *Attorney, Agent, or Firm* — Crowell & Moring LLP

(57)      ABSTRACT

According to an aspect of the present invention, a vehicle control device, a vehicle control method, and a vehicle control system acquire a setting condition including at least one of information related to a driving environment of a driving road on which a vehicle travels and information related to a state of the vehicle; set, based on the setting condition, an interval between trajectory points representing a target trajectory along which the vehicle is caused to travel; and output a control command that causes the vehicle to travel along the target trajectory. This makes it possible to prevent the driving performance of a vehicle from decreasing even when the conditions surrounding the vehicle change.

20 Claims, 16 Drawing Sheets

(52) U.S. Cl.
CPC ..... *B60W 2552/30* (2020.02); *B60W 2552/40*
(2020.02); *B60W 2554/802* (2020.02); *B60W*
*2554/804* (2020.02)

(58) Field of Classification Search
CPC ... B60W 60/0018; G08G 1/165; G08G 1/166;
G06T 7/248; G06T 7/53; G06T 7/55;
B25J 19/06
USPC ..................................................... 701/41, 467
See application file for complete search history.

(56) References Cited

U.S. PATENT DOCUMENTS

| | | | | |
|---|---|---|---|---|
| 11,816,991 | B2 * | 11/2023 | Stein ...................... | G06V 20/58 |
| 11,964,667 | B2 * | 4/2024 | Ueno ...................... | G06V 20/56 |
| 2017/0259819 | A1 | 9/2017 | Takeda et al. | |
| 2019/0118831 | A1 * | 4/2019 | Mimura ................ | B60W 30/00 |
| 2020/0290624 | A1 * | 9/2020 | Kumano ............ | B60W 60/0011 |
| 2022/0332318 | A1 * | 10/2022 | Sakayori ............... | B60W 30/16 |

FOREIGN PATENT DOCUMENTS

| | | |
|---|---|---|
| JP | 2017-165153 A | 9/2017 |
| JP | 2020-163971 A | 10/2020 |
| JP | 2020-163984 A | 10/2020 |
| WO | WO 2017/168738 A1 | 10/2017 |

OTHER PUBLICATIONS

Japanese-language Office Action issued in Japanese Application No. 2023-554939 dated Jul. 23, 2024 with English translation (12 pages).

Extended European Search Report issued in European Application No. 22883191.3 dated Dec. 20, 2024 (7 pages).

International Search Report (PCT/ISA/210) issued in PCT Application No. PCT/JP2022/030518 dated Nov. 1, 2022 with English translation (5 pages).

Japanese-language Written Opinion (PCT/ISA/237) issued in PCT Application No. PCT/JP2022/030518 dated Nov. 1, 2022 with English translation (7 pages).

* cited by examiner

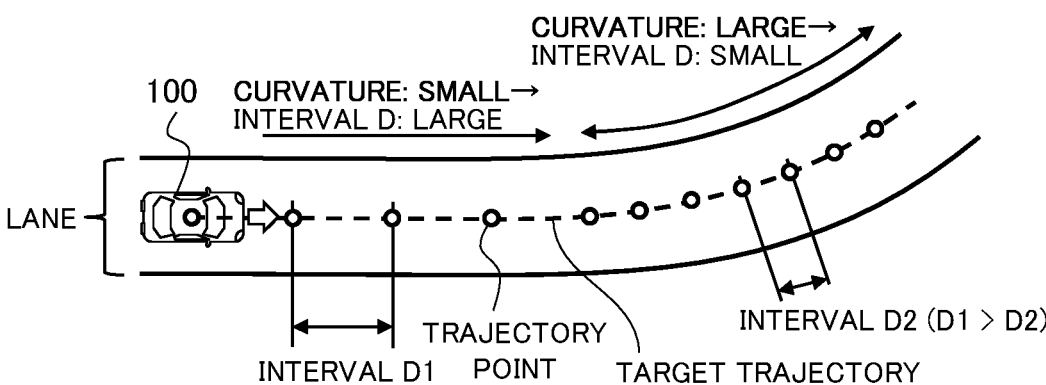

CURVATURE: LARGE→
INTERVAL D: SMALL

100    CURVATURE: SMALL→
INTERVAL D: LARGE

LANE

INTERVAL D2 (D1 > D2)

TRAJECTORY
POINT    TARGET TRAJECTORY

INTERVAL D1

FIG. 3

TRAJECTORY POINT

CURVATURE RADIUS $R$

CENTER

ERROR TE

INTERVAL D $$\alpha = \frac{1}{2}\sqrt{4R^2 - D^2}$$

TRAJECTORY POINT

DISTANCE $\beta$ FROM
OBSTACLE          OBSTACLE OB

LANE

INTERVAL D1

TRAJECTORY POINT    INTERVAL D2 (D1 > D2)

TARGET TRAJECTORY

FIG. 20

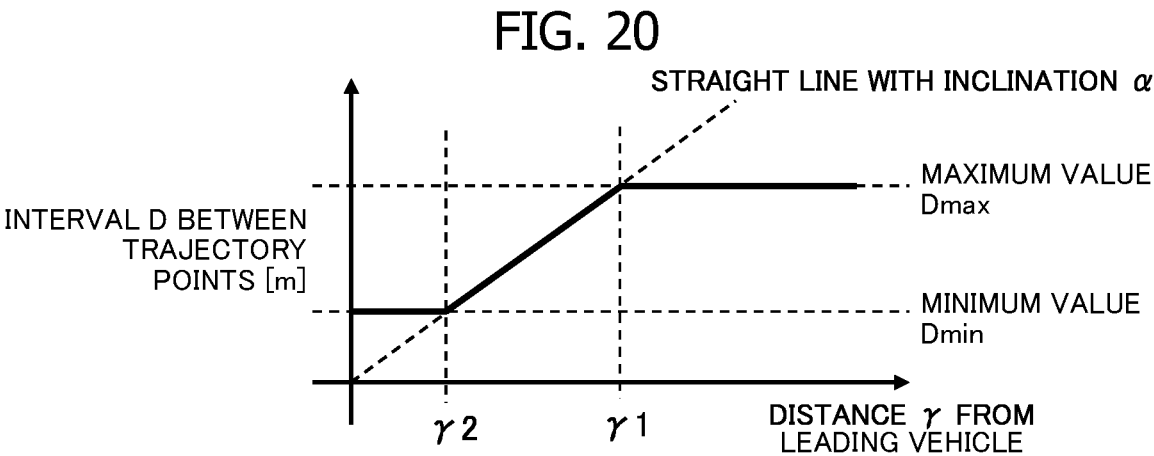

STRAIGHT LINE WITH INCLINATION $\alpha$

INTERVAL D BETWEEN TRAJECTORY POINTS [m]

MAXIMUM VALUE Dmax

MINIMUM VALUE Dmin $\gamma 2$     $\gamma 1$

DISTANCE $\gamma$ FROM LEADING VEHICLE

FIG. 21

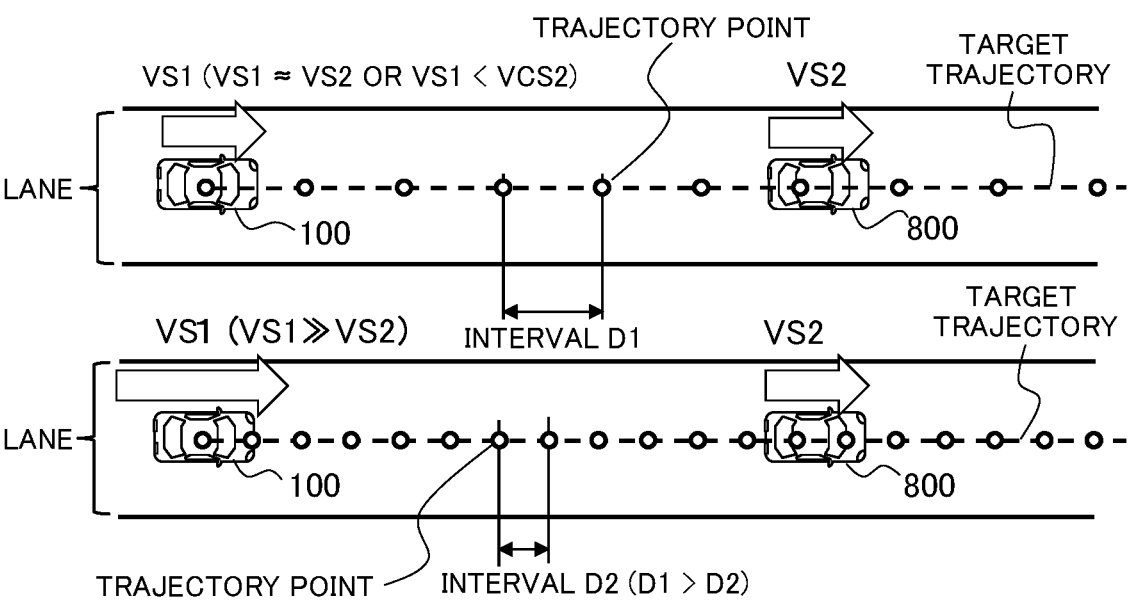

TRAJECTORY POINT

VS1 (VS1 ≈ VS2 OR VS1 < VCS2)     VS2     TARGET TRAJECTORY

LANE 100     800

INTERVAL D1

VS1 (VS1 ≫ VS2)     VS2     TARGET TRAJECTORY

LANE 100     800

TRAJECTORY POINT     INTERVAL D2 (D1 > D2)

FIG. 22

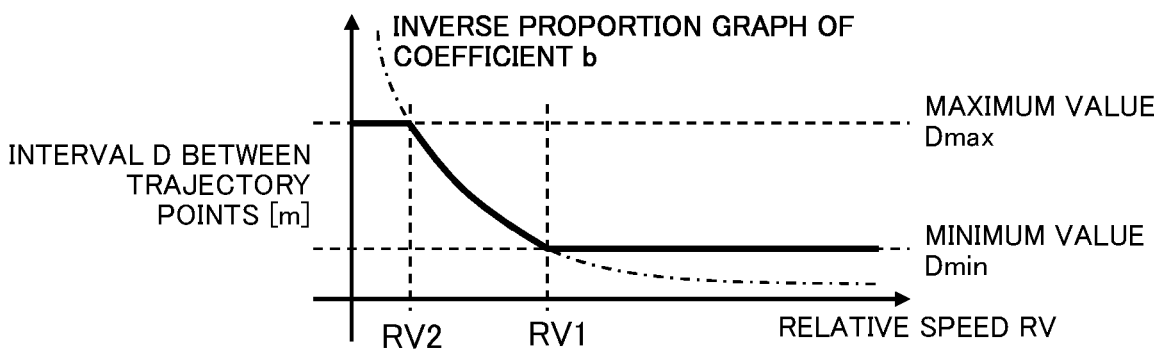

INVERSE PROPORTION GRAPH OF COEFFICIENT b

INTERVAL D BETWEEN TRAJECTORY POINTS [m]

MAXIMUM VALUE Dmax

MINIMUM VALUE Dmin

RV2     RV1     RELATIVE SPEED RV

FIG. 23
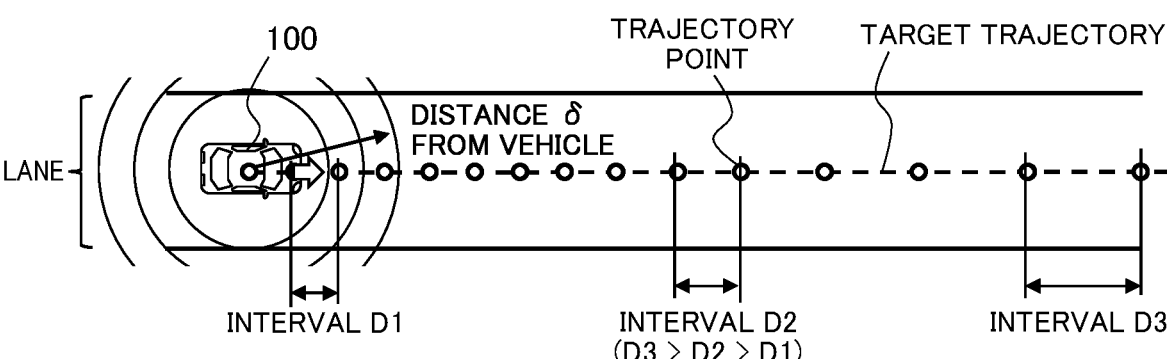
FIG. 24
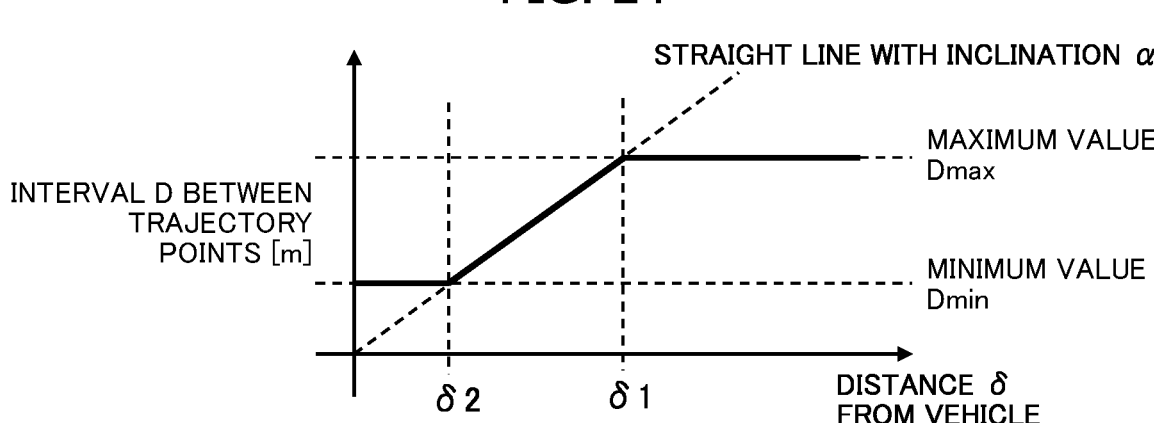
FIG. 25

INTERVAL D BETWEEN
TRAJECTORY
POINTS [m]

INVERSE PROPORTION GRAPH OF
COEFFICIENT a

MAXIMUM VALUE
Dmax

MINIMUM VALUE
Dmin

ME2      ME1

MEASUREMENT ERROR ME
OF ENVIRONMENT
RECOGNITION UNIT (RECOGNITION ACCURACY: HIGH ⟸⟹ RECOGNITION ACCURACY: LOW)

100

START POINT

TRAJECTORY POINT

TARGET POINT

INTERVAL D

TARGET TRAJECTORY

NEWLY SET
TRAJECTORY POINT

FIG. 39

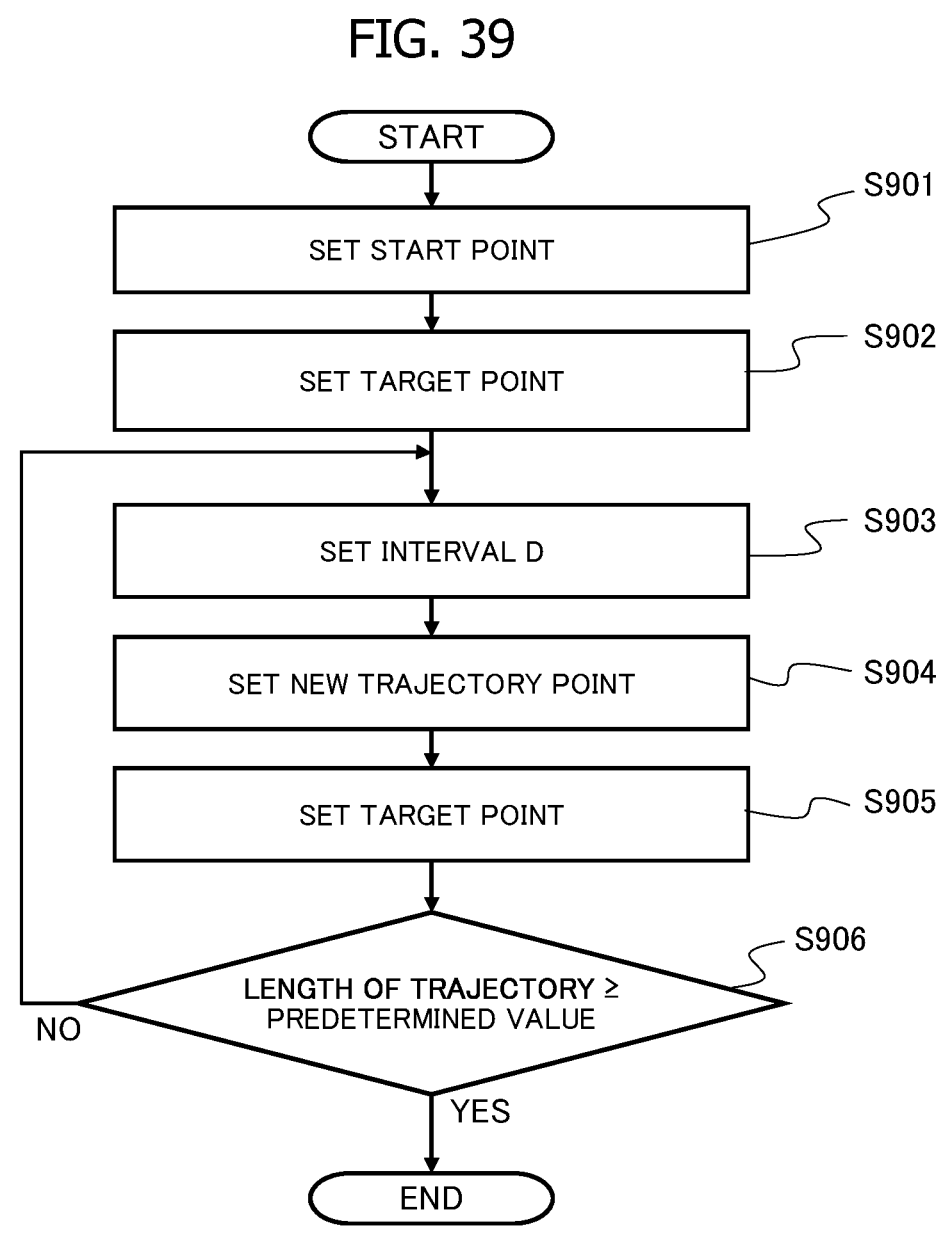

START

SET START POINT — S901

SET TARGET POINT — S902

SET INTERVAL D — S903

SET NEW TRAJECTORY POINT — S904

SET TARGET POINT — S905

LENGTH OF TRAJECTORY ≥ PREDETERMINED VALUE — S906

NO

YES

END

VEHICLE CONTROL DEVICE, VEHICLE CONTROL METHOD, AND VEHICLE CONTROL SYSTEM

TECHNICAL FIELD

The present invention relates to a vehicle control device, to a vehicle control method, and to a vehicle control system.

BACKGROUND ART

A driver assistance device disclosed in Patent Document 1 includes a controller that selects, as a selected route, one of multiple route candidates to a destination position. The controller performs a route candidate calculation process of calculating the multiple route candidates, a route cost calculation process of calculating route costs of the multiple route candidates, and a route selection process of selecting one of the multiple route candidates as the selected route based on the route costs. In the route cost calculation process, the controller sets a potential energy distribution centered around the destination position such that the energy value decreases as the distance from the destination position increases, calculates the total value of kinetic energy and potential energy of a vehicle along each route candidate, and calculates the cumulative value of fluctuation components of the total value along the route candidate as a route cost.

REFERENCE DOCUMENT LIST

Patent Document

Patent Document 1: JP 2020-163971 A

SUMMARY OF THE INVENTION

Problem to be Solved by the Invention

In controlling the motion state of a vehicle to cause the vehicle to travel along a target trajectory, when intervals between multiple trajectory points representing the target trajectory are always constant, the driving performance of the vehicle may decrease depending on conditions.

The present invention has been made in view of the above problem, and an object of the present invention is to provide a vehicle control device, a vehicle control method, and a vehicle control system that can suppress the decrease in the driving performance of a vehicle.

Means for Solving the Problem

According to an aspect of the present invention, the intervals between trajectory points, which represent a target trajectory along which a vehicle is caused to travel, are set based on a setting condition including at least one of information related to the driving environment of a driving road on which the vehicle travels and information related to the state of the vehicle.

Effects of the Invention

The present invention makes it possible to suppress the decrease in the driving performance of a vehicle.

BRIEF DESCRIPTION OF THE DRAWINGS

FIG. 1 is a block diagram illustrating an example of a vehicle control system.

FIG. 2 is a diagram illustrating changes in intervals between trajectory points depending on the curvature of a travel course.

FIG. 3 is a diagram illustrating the correlation among a course error of a target trajectory, intervals between trajectory points, and a curvature radius.

FIG. 4 is a diagram illustrating changes in intervals between trajectory points depending on the distance from an obstacle.

FIG. 20 is a diagram showing an example of a mode for obtaining intervals between trajectory points based on the distance from a leading vehicle.

FIG. 21 is a diagram illustrating changes in intervals between trajectory points depending on a relative speed.

FIG. 22 is a diagram showing an example of a mode for obtaining intervals between trajectory points based on a relative speed.

FIG. 23 is a diagram illustrating changes in intervals between trajectory points depending on the distance from a vehicle.

FIG. 24 is a diagram showing a first example of a mode for obtaining intervals between trajectory points based on the distance from a vehicle.

FIG. 25 is a diagram showing a second example of a mode for obtaining intervals between trajectory points based on the distance from a vehicle.

FIG. 39 is a flowchart illustrating a process of setting a trajectory point.

MODE FOR CARRYING OUT THE INVENTION

Figure 5:
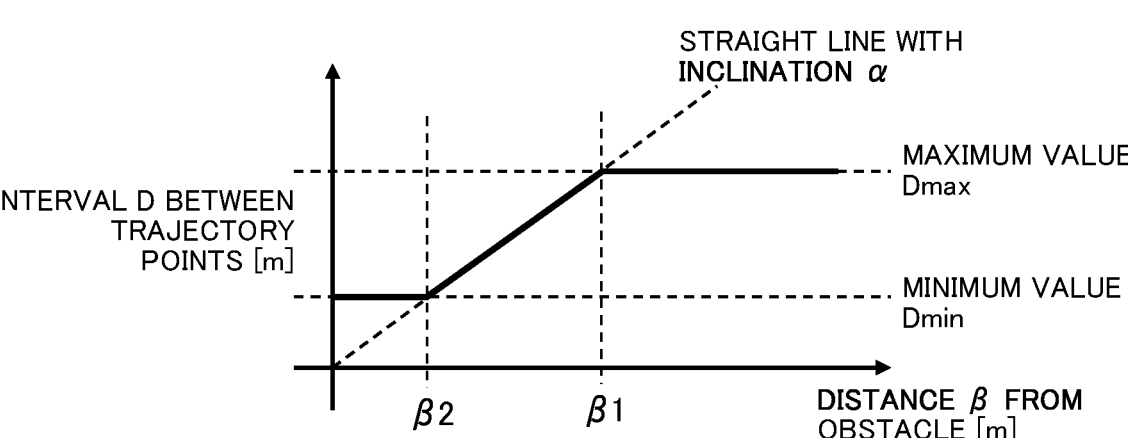
FIG. 5 is a diagram showing a first example of a mode for obtaining intervals between trajectory points based on the distance from an obstacle.

A vehicle control device, a vehicle control method, and a vehicle control system according to embodiments of the present invention are described below with reference to the drawings.

Figure 1:
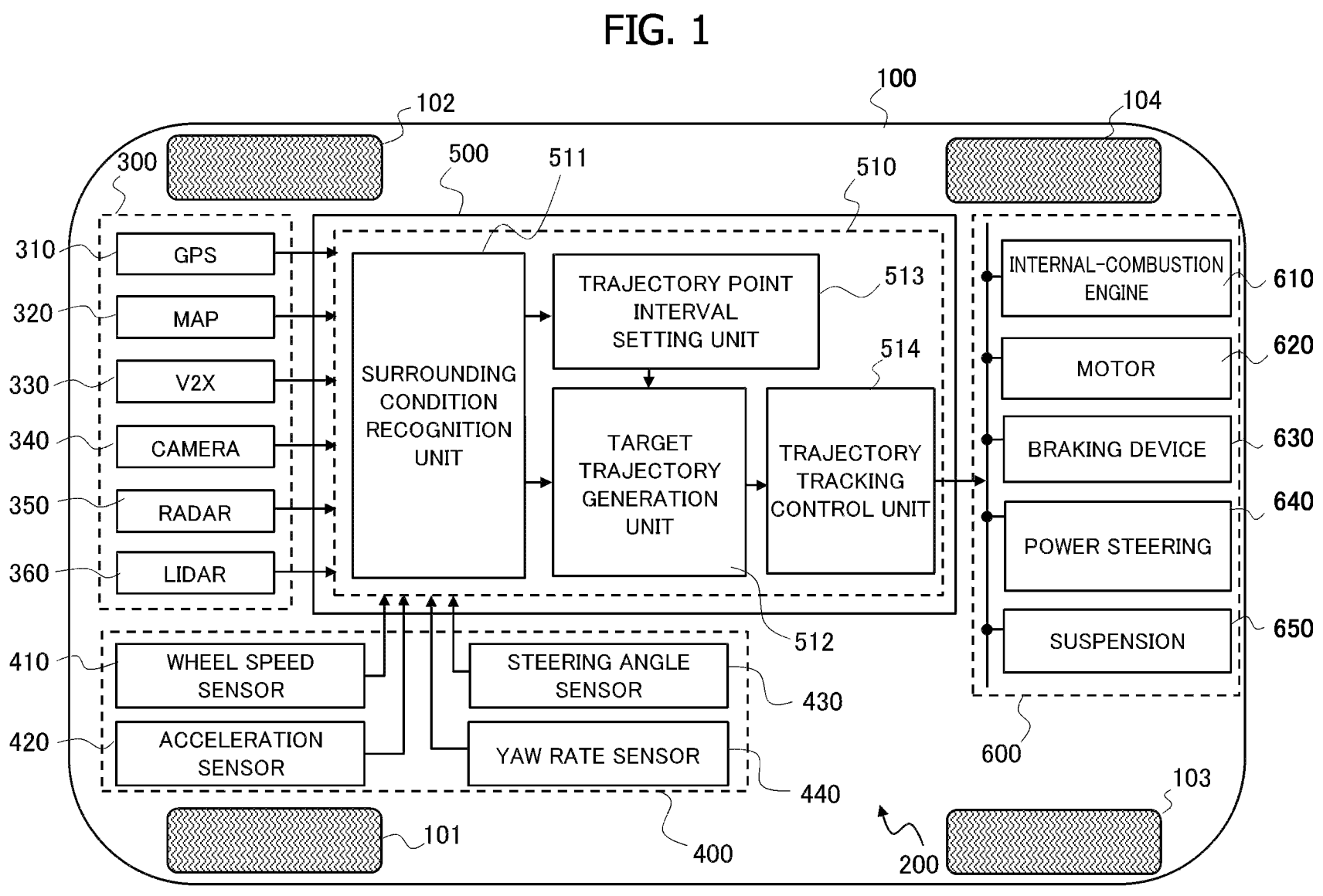

FIG. 1 is a block diagram illustrating an example of a vehicle control system 200 provided in a vehicle 100, such as a four-wheeled vehicle.

Vehicle control system 200 controls the motion of vehicle 100 and includes an environment recognition unit 300, a vehicle state acquisition unit 400, a vehicle control device 500, and an actuator unit 600.

Environment recognition unit 300 acquires external information of vehicle 100, in other words, information related to the driving environment of a driving road on which vehicle 100 travels.

Environment recognition unit 300 includes a global positioning system (GPS) receiving unit 310, a map database 320, a road-to-vehicle communication device 330, a camera 340, a radar 350, and a LiDAR (light detection and ranging, laser imaging detection and ranging) 360.

GPS receiving unit 310 receives signals from GPS satellites and thereby measures the latitude and the longitude of the position of vehicle 100.

Map database 320 is formed in a storage device provided in vehicle 100.

Map information in map database 320 includes information such as road locations, road shapes, and intersection locations.

Road-to-vehicle communication device 330 transmits information on vehicle 100 to a roadside device and receives road traffic information, such as curves and intersections, from the roadside device.

Environment recognition unit 300 may include a vehicle-to-vehicle communication device that acquires, for example, road traffic information and behavior information of other vehicles from the other vehicles.

Camera 340 is, for example, a stereo camera, a monocular camera, or a 360-degree camera and captures surroundings of vehicle 100 to obtain image information of the surroundings of vehicle 100.

Radar 350 and LiDAR 360 detect objects around vehicle 100 and output information on the detected objects.

Objects to be detected by radar 350 and LiDAR 360 include moving objects and stationary objects.

Vehicle state acquisition unit 400 acquires information related to the states of vehicle 100 including information related to the motion state of vehicle 100.

Vehicle state acquisition unit 400 includes a wheel speed sensor 410, an acceleration sensor 420, a steering angle sensor 430, and a yaw rate sensor 440.

Wheel speed sensor 410 detects the rotational speed of each of wheels 101-104 of vehicle 100.

Vehicle control device 500 calculates a speed VS of vehicle 100 based on information on the rotational speeds of wheels 101-104 detected by the wheel speed sensor 410.

A vehicle speed sensor that detects the speed of vehicle 100 may be provided instead of, or in addition to, wheel speed sensor 410.

Acceleration sensor 420 detects the longitudinal acceleration and the lateral acceleration (or the horizontal acceleration) of vehicle 100.

Steering angle sensor 430 detects a steering angle SA, which is an angle of road wheels changed by an electronically controlled power steering device 640 included in vehicle 100.

Steering angle sensor 430 detects 0 degrees when the steering angle is at the neutral steering position and uses a positive sign and a negative sign to indicate right and left steering angles.

Yaw rate sensor 440 detects the yaw rate of vehicle 100.

Vehicle control device 500 includes a microcomputer 510 functioning as a control unit that performs calculations based on input information and outputs calculation results.

Microcomputer 510 includes, for example, a microprocessor unit (MPU), a read-only memory (ROM), and a random access memory (RAM) (not shown).

Microcomputer 510 acquires, from environment recognition unit 300, information related to the driving environment of a driving road on which vehicle 100 travels. For example, the information includes positional information of vehicle 100, road shape information, road surface information, and information related to objects around vehicle 100.

Microcomputer 510 also acquires, from vehicle state acquisition unit 400, information, such as speed, acceleration, steering angle, and yaw rate, related to the motion state of vehicle 100.

Microcomputer 510 sets a target trajectory based on various types of information acquired and outputs, to actuator unit 600, a control command for causing vehicle 100 to travel along the target trajectory.

Microcomputer 510 includes a surrounding condition recognition unit 511, a target trajectory generation unit 512, a trajectory point interval setting unit 513, and a trajectory tracking control unit 514 as functions implemented by software.

Surrounding condition recognition unit 511 recognizes conditions surrounding vehicle 100 based on information related to a driving environment acquired from environment recognition unit 300 and information related to the motion state of vehicle 100 acquired from vehicle state acquisition unit 400.

The conditions surrounding vehicle 100 recognized by surrounding condition recognition unit 511 include information indicating, for example, the curvature of a road, a road surface cant, a road surface slope, a friction coefficient μ of a road surface, the positions of right and left lane markers, right and left road edge positions, moving objects, and stationary objects.

A moving object is, for example, a pedestrian, a bicycle, a motorcycle, or another vehicle; and a stationary object is, for example, road debris, a traffic light, a guardrail, a curb, a road sign, a tree, or a signboard.

Based on the conditions around vehicle 100 recognized by surrounding condition recognition unit 511, target trajectory generation unit 512 sets a target trajectory that is a route along which vehicle 100 automatically travels in the future.

The target trajectory (more specifically, a target travel course) is represented by trajectory points that are arranged at a predetermined travel distance. Each of the trajectory points indicates a location at which vehicle 100 is to arrive.

Also, as information on the target trajectory, target trajectory generation unit 512 sets a target speed and target acceleration for each predetermined sampling time.

Trajectory tracking control unit 514 acquires information on the target trajectory set by target trajectory generation unit 512.

Then, trajectory tracking control unit 514 calculates control commands, such as a steering command, an acceleration command, and a deceleration command, for causing vehicle 100 to travel along the target trajectory, and outputs the calculated control commands to actuator unit 600.

The information on the target trajectory includes a target travel course, a target speed, and target acceleration.

Actuator unit 600 controls the motion state of vehicle 100 based on the control commands from trajectory tracking control unit 514.

Actuator unit 600 includes an internal-combustion engine 610 and a motor 620 that generate a driving force for driving vehicle 100, a braking device 630 that applies a braking force to vehicle 100, an electronic control power steering device 640 for changing the travel direction of vehicle 100, and an electronically controlled suspension 650 that can adjust the damping force and the vehicle height.

In response to the control commands from trajectory tracking control unit 514, actuator unit 600 generates, for example, a driving force, a braking force, and a steering force.

Also, trajectory tracking control unit 514 can cause motor 620 to operate as a power generator and apply a braking force, i.e., a regenerative braking force, to vehicle 100.

Trajectory point interval setting unit 513 can variably set intervals D [m] between trajectory points of a target trajectory set by target trajectory generation unit 512 based on a setting condition including at least one of information related to the driving environment of a driving road on which vehicle 100 travels and information related to a state of vehicle 100.

In other words, target trajectory generation unit 512 sets trajectory points, which are locations at which vehicle 100 is to arrive, with intervals D (or inter trajectory point distances) set by trajectory point interval setting unit 513.

Thus, microcomputer 510 (or a control unit) provided in vehicle 100 performs a vehicle control method of acquiring a setting condition including at least one of information related to the driving environment of a driving road on which vehicle 100 travels and information related to a state of vehicle 100, setting, based on the setting condition, intervals D between multiple trajectory points representing a target trajectory along which vehicle 100 is caused to travel, and outputting control commands for causing vehicle 100 to travel along the target trajectory.

The information related to the driving environment of a driving road is, for example, information related to the road shape of the driving road, information related to the distance from an obstacle located ahead of vehicle 100 on the driving road, information related to the friction coefficient of the surface of the driving road, information related to the distance from a leading vehicle traveling ahead of vehicle 100 on the driving road, information related to the relative speed of vehicle 100 relative to the leading vehicle, or information related to the distance from vehicle 100 on the driving road.

The information related to the road shape of a driving road is, for example, information related to the curvature of a travel course, information related to the width of the driving road, or information related to the curvature change of a travel course.

The information related to the state of vehicle 100 is, for example, information related to the motion state of vehicle 100 or information related to the recognition accuracy of environment recognition unit 300 of vehicle 100.

The information related to the motion state of vehicle 100 is, for example, information related to the speed of vehicle 100, information related to the lateral jerk of vehicle 100, or information related to the steering angle of vehicle 100.

Trajectory point interval setting unit 513 can set intervals D between trajectory points based on multiple different setting conditions including multiple different sets of information related to the driving environment of the driving road and the state of vehicle 100.

With trajectory point interval setting unit 513 configured to set the intervals between trajectory points based on the setting conditions as described above, it is possible to achieve the necessary trajectory tracking accuracy, improve the accuracy in steering angle control, and respond to changes in the driving environment. This in turn makes it possible to prevent the driving performance of vehicle 100 from decreasing under various conditions.

FIG. 1 is merely an example of vehicle control system 200, and multiple sensors included in environment recognition unit 300 and multiple sensors included in vehicle state acquisition unit 400 can be selected as appropriate depending on embodiments.

For example, when an embodiment not requiring road-to-vehicle communication is employed, as described later, environment recognition unit 300 does not need to include road-to-vehicle communication device 330.

Below, an example of trajectory point interval setting unit 513 is described in detail.

First Embodiment

In a first embodiment, trajectory point interval setting unit 513 acquires, as information used as a setting condition and related to the driving environment of a driving road on which vehicle 100 travels, information related to the road shape, specifically, information related to the curvature of a travel course of vehicle 100.

Trajectory point interval setting unit 513 can acquire the curvature of a travel course by referring to map database 320 based on the positional information of vehicle 100 or from a roadside device via road-to-vehicle communication device 330.

Also, trajectory point interval setting unit 513 can acquire curvature information that is obtained from information on a center line or a white line recognized by the camera 340.

Trajectory point interval setting unit 513 sets intervals D [m] between trajectory points (in other words, the distances between neighboring trajectory points) such that intervals D decrease as the curvature of the travel course increases, in other words, as the curvature radius of the travel course decreases.

The curvature of the travel course of vehicle 100 is a road curvature based on lane recognition or map data or a curvature of a target trajectory (in other words, a target route).

FIG. 2 illustrates an example in which trajectory point interval setting unit 513 sets intervals D between trajectory points based on the curvature of a travel course such that intervals D in a straight section differ from those in a curve section.

Trajectory point interval setting unit 513 sets intervals D1 used when vehicle 100 travels along a straight section where the curvature of a road (or a target trajectory) is small and intervals D2 used when vehicle 100 travels along a curve section where the curvature of the road is large such that intervals D2 are less than intervals D1 (D2<D1).

In a case in which a target trajectory is expressed by arranging trajectory points at which vehicle 100 is to arrive, when intervals D are too large in relation to the curvature, the shape of a curve cannot be expressed accurately.

On the other hand, when intervals D are small, the number of trajectory points necessary to express a target trajectory with a required length increases. As a result, it becomes necessary to secure a large amount of memory to record a target trajectory (specifically, trajectory points), and the computational load of microcomputer 510 increases.

For the above reason, trajectory point interval setting unit 513 decreases intervals D as the curvature of a travel course increases. This makes it possible to express the shape of a curve with required accuracy and maintain the trajectory tracking accuracy. Also, trajectory point interval setting unit 513 decreases the number of trajectory points in a straight section. This makes it possible to reduce the required amount of memory and reduce the computational load of microcomputer 510.

FIG. 3 shows that a course error TE of a target trajectory is based on the correlation between intervals D of trajectory points and a curvature radius R.

Here, a distance $\alpha$ between a straight line connecting two adjacent trajectory points and the center of curvature radius R is obtained by formula 1.

$$\alpha = \frac{1}{2}\sqrt{4R^2 - D^2} \qquad \text{[Formula 1]}$$

8

Accordingly, course error TE is obtained by formula 2.

$$TE = R - \frac{1}{2}\sqrt{4R^2 - D^2} \qquad \text{[Formula 2]}$$

Here, trajectory point interval setting unit 513 sets intervals D between trajectory points to the largest possible distance within a range in which course error TE is less than or equal to a set value $\Delta TE$ (in other words, a maximum allowable value).

That is, trajectory point interval setting unit 513 sets intervals D between trajectory points such that formula 3 is satisfied.

$$D \leq 2\sqrt{(2R - \Delta TE)\Delta TE} \qquad \text{[Formula 3]}$$

Trajectory point interval setting unit 513 can vary set value $\Delta TE$ according to curvature radius R.

When it is determined that curvature radius R is greater than a set value and the travel course is a substantially straight section, trajectory point interval setting unit 513 sets intervals D between trajectory points to maximum value Dmax.

That is, as curvature radius R decreases, trajectory point interval setting unit 513 decreases intervals D between trajectory points within a range less than or equal to maximum value Dmax.

Second Embodiment

In a second embodiment, trajectory point interval setting unit 513 acquires, as information used as a setting condition and related to the driving environment of a driving road on which vehicle 100 travels, information related to the distance from an obstacle located ahead of vehicle 100 on the driving road.

Trajectory point interval setting unit 513 decreases intervals D between trajectory points as the distance from the obstacle decreases.

Trajectory point interval setting unit 513 can obtain positional information of the obstacle as information of an object recognized by camera 340, radar 350, or LiDAR 360.

When there is an obstacle in the way of vehicle 100 on the driving road, target trajectory generation unit 512 sets a target trajectory such that vehicle 100 travels around the obstacle recognized by environment recognition unit 300.

FIG. 4 illustrates an example of a target trajectory that is set when an obstacle OB exists on the left side of a driving road in the direction of travel of vehicle 100.

In this case, target trajectory generation unit 512 sets a target trajectory that goes around the right side of obstacle OB so that vehicle 100 circumvents obstacle OB.

Here, if the tracking accuracy of vehicle 100 tracking a course (that is, the target trajectory) set to circumvent obstacle OB is low, vehicle 100 may contact obstacle OB. Therefore, the target trajectory near obstacle OB needs to be accurately tracked.

For the above reason, trajectory point interval setting unit 513 accurately expresses a target trajectory that enables vehicle 100 to travel around obstacle OB by decreasing intervals D between trajectory points as a distance $\beta$ from obstacle OB decreases so that vehicle 100 can accurately track the target trajectory that circumvents obstacle OB.

Trajectory point interval setting unit 513 may set distance β from obstacle OB to the distance from the center of obstacle OB illustrated in FIG. 4, the shortest distance from obstacle OB, or the distance from an end of obstacle OB in the direction in which the lane extends.

A method of determining intervals D between trajectory points according to distance β from obstacle OB is described in detail below.

FIG. 5 illustrates a mode in which trajectory point interval setting unit 513 decreases intervals D between trajectory points in proportion to the decrease in distance β from obstacle OB.

According to the mode illustrated in FIG. 5, trajectory point interval setting unit 513 sets intervals D between trajectory points to a predetermined maximum value Dmax in an area where distance β from obstacle OB located ahead of vehicle 100 is greater than a first predetermined value β1, that is, an area far from obstacle OB.

Predetermined maximum value Dmax is a normal value used when there is no obstacle OB.

In an area where distance β from obstacle OB is less than first predetermined value β1, trajectory point interval setting unit 513 decreases intervals D between trajectory points from predetermined maximum value Dmax in proportion to the decrease in distance β from obstacle OB.

Also, trajectory point interval setting unit 513 sets intervals D between trajectory points to a predetermined minimum value Dmin that is less than predetermined maximum value Dmax (Dmax>Dmin>0) in an area where distance β from obstacle OB is less than or equal to a second predetermined value β2 that is less than first predetermined value β1 (β1>β2>0), that is, in the vicinity of obstacle OB.

Predetermined minimum value Dmin is intervals D between trajectory points that are set at a value less than the normal value so that a course circumventing obstacle OB can be accurately expressed.

Changes in intervals D between trajectory points relative to changes in distance β from obstacle OB are not necessarily in constant multiples.

Figure 6:
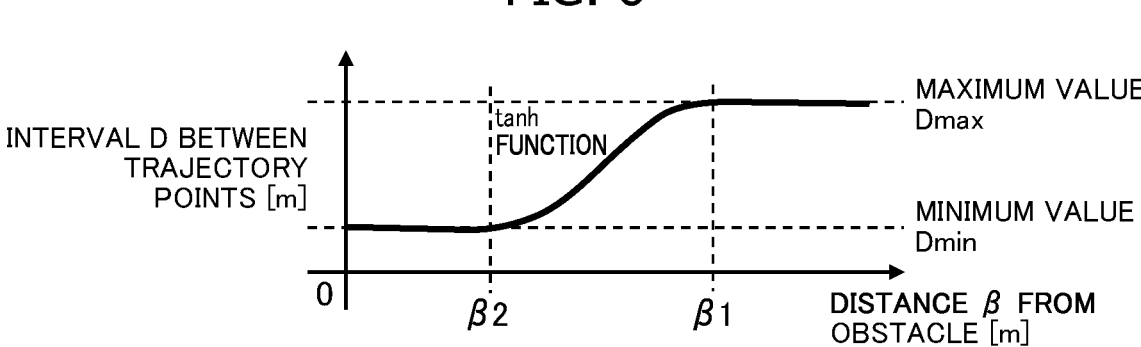
FIG. 6 is a diagram showing a second example of a mode for obtaining intervals between trajectory points based on the distance from an obstacle.

FIG. 6 illustrates an example in which the correlation between intervals D between trajectory points and distance β from obstacle OB is expressed by a tanh function (or a hyperbolic tangent function) so that intervals D change more smoothly relative to changes in distance β.

Also in the example of FIG. 6, trajectory point interval setting unit 513 sets intervals D between trajectory points to predetermined maximum value Dmax in an area where distance β from obstacle OB is greater than or equal to first predetermined value β1 and sets intervals D between trajectory points to predetermined minimum value Dmin in an area where distance β from obstacle OB is less than or equal to second predetermined value β2 (β2<β1).

In an area where distance β from obstacle OB is between first predetermined value β1 and second predetermined value β2, trajectory point interval setting unit 513 decreases intervals D between trajectory points as distance β from obstacle OB decreases according to characteristics represented by, for example, a tanh function.

Figure 7:
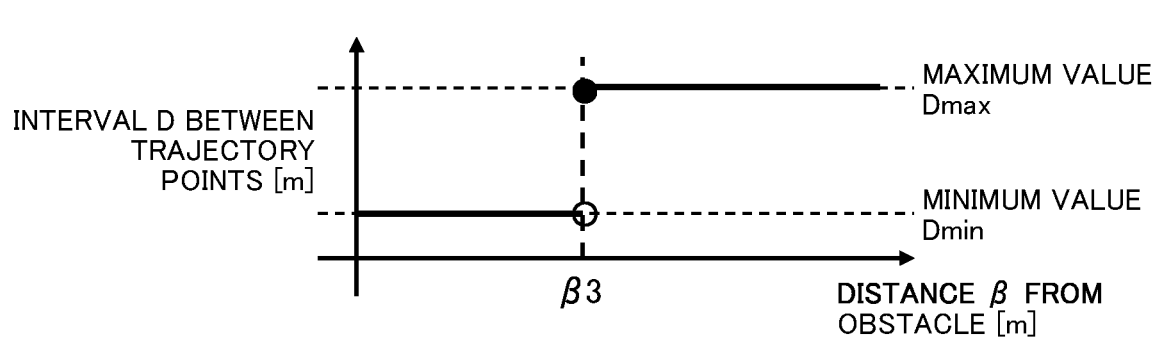
FIG. 7 is a diagram showing a third example of a mode for obtaining intervals between trajectory points based on the distance from an obstacle.

FIG. 7 illustrates a mode in which intervals D between trajectory points are switched to one of predetermined maximum value Dmax (in other words, the normal value) and predetermined minimum value Dmin (in other words, a distance less than the normal value) depending on whether distance β from obstacle OB is greater than or less than a predetermined value β3 (predetermined value β3>0 [m]).

That is, trajectory point interval setting unit 513 may function not only in a mode in which intervals D between trajectory points are gradually increased and decreased according to changes in distance β from obstacle OB but also in a mode in which intervals D between trajectory points are a variable that can take two different values depending on whether distance β from obstacle OB is greater than or less than a threshold.

Third Embodiment

In a third embodiment, trajectory point interval setting unit 513 acquires, as information used as a setting condition and related to the driving environment of a driving road on which vehicle 100 travels, information related to a friction coefficient μ of the surface of the driving road, and decreases intervals D between trajectory points as friction coefficient μ of the surface of the driving road decreases.

That is, trajectory point interval setting unit 513 changes intervals D between trajectory points according to friction coefficient μ of a driving road on which trajectory points are to be set. Specifically, trajectory point interval setting unit 513 sets intervals D between trajectory points on a driving road with low friction coefficient μ to a value that is less than intervals D between trajectory points on a driving road with high friction coefficient μ.

Trajectory point interval setting unit 513 can obtain information on friction coefficient μ estimated based on the difference between the actual vehicle behavior and an output of a vehicle model.

Trajectory point interval setting unit 513 may also obtain information on friction coefficient μ from a roadside device via road-to-vehicle communication device 330.

When vehicle 100 travels on a road surface with low friction coefficient μ, the wheels of vehicle 100 tend to slip easily, and the accuracy in tracking a target trajectory may decrease.

Therefore, trajectory point interval setting unit 513 decreases intervals D between trajectory points as friction coefficient μ of the road surface decreases so that a target trajectory can be accurately expressed and vehicle 100 traveling on a slippery road surface with low friction coefficient μ can accurately track the target trajectory.

Figure 8:
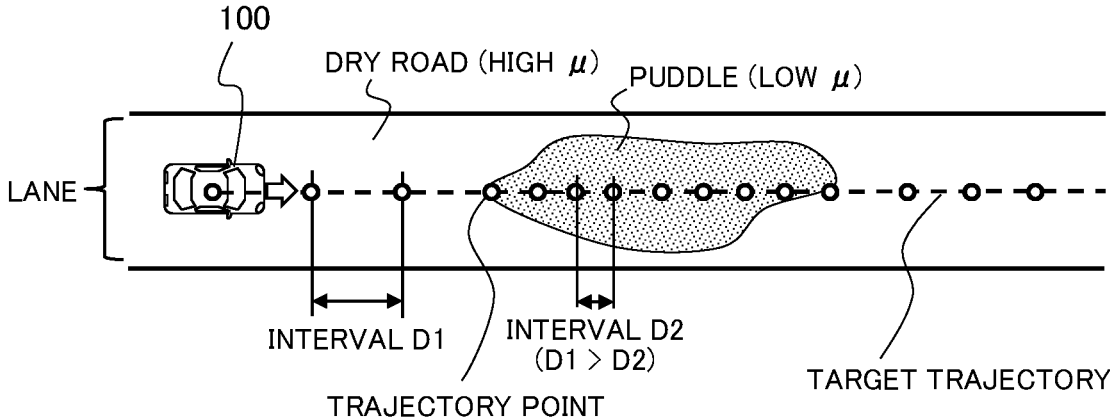
FIG. 8 is a diagram illustrating changes in intervals between trajectory points depending on the friction coefficient of a road surface.

FIG. 8 illustrates changes in intervals D between trajectory points when a partial area, such as a puddle or an icy portion, with low friction coefficient μ is present on a driving road ahead of vehicle 100.

In this example, in an area, such as a puddle, with low friction coefficient μ, trajectory point interval setting unit 513 sets intervals D between trajectory points to a value that is less than intervals D used for a dry road preceding and following the area to accurately express a target trajectory in the area with low friction coefficient μ.

When friction coefficient μ of the entire driving road is low due to, for example, rainfall, trajectory point interval setting unit 513 uniformly decreases intervals D between trajectory points representing a target trajectory.

Also, when friction coefficients μ of road surfaces under the right wheels and the left wheels of vehicle 100 differ from each other, trajectory point interval setting unit 513 can set intervals D between trajectory points based on, for example, the lower one of left and right friction coefficients μ.

Figure 9:
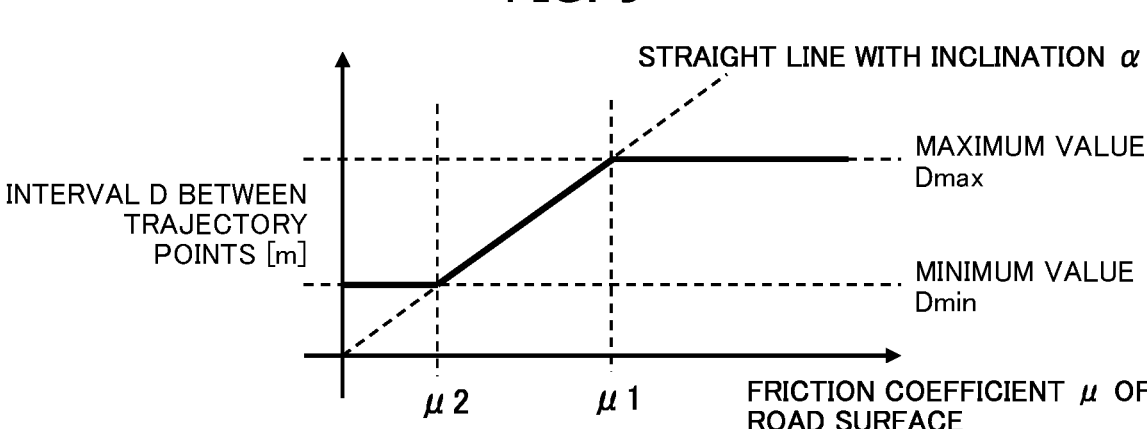
FIG. 9 is a diagram showing a first example of a mode for obtaining intervals between trajectory points based on the friction coefficient of a road surface.

FIG. 9 illustrates a mode in which trajectory point interval setting unit 513 decreases intervals D between trajectory points in proportion to the decrease in friction coefficient μ of a road surface.

In the mode illustrated in FIG. 9, trajectory point interval setting unit 513 sets intervals D between trajectory points to predetermined maximum value Dmax in an area where friction coefficient μ of the road surface is greater than or equal to a first predetermined value μ1, i.e., for the road surface of, for example, a dry road with sufficiently high friction coefficient μ.

That is, first predetermined value μ1 is, for example, a threshold used to determine whether a road surface is a normal dry road or is more slippery than the dry road.

Predetermined maximum value Dmax is a normal value of intervals D between trajectory points that can achieve sufficient accuracy in tracking a target trajectory on a dry road.

When friction coefficient μ of a road surface is less than first predetermined value μ1, trajectory point interval setting unit 513 decreases intervals D between trajectory points from predetermined maximum value Dmax in proportion to the decrease in friction coefficient μ of the road surface.

Also, in an area where friction coefficient μ of the road surface is less than or equal to a second predetermined value μ2 that is less than first predetermined value μ1, trajectory point interval setting unit 513 sets intervals D between trajectory points to predetermined minimum value Dmin.

Changes in intervals D between trajectory points relative to changes in friction coefficient μ of a road surface are not necessarily in constant multiples.

Figure 10:
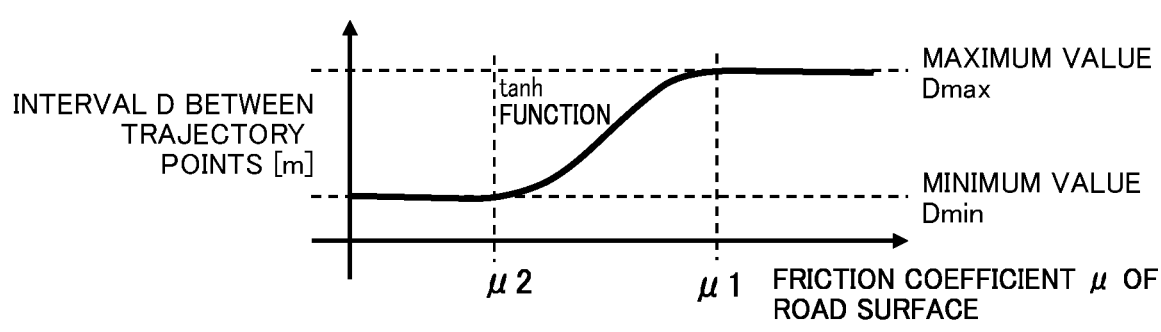
FIG. 10 is a diagram showing a second example of a mode for obtaining intervals between trajectory points based on the friction coefficient of a road surface.

FIG. 10 illustrates an example in which the correlation between intervals D between trajectory points and friction coefficient μ of a road surface is expressed by a tanh function so that intervals D change more smoothly relative to changes in friction coefficient μ.

Also in the mode illustrated in FIG. 10, trajectory point interval setting unit 513 sets intervals D between trajectory points to predetermined maximum value Dmax in an area where friction coefficient μ of the road surface is greater than or equal to first predetermined value μ1 and sets intervals D between trajectory points to predetermined minimum value Dmin in an area where friction coefficient μ of the road surface is less than or equal to second predetermined value μ2 (μ2<μ1).

In an area where friction coefficient μ of the road surface is between first predetermined value μ1 and second predetermined value μ2, trajectory point interval setting unit 513 decreases intervals D between trajectory points as friction coefficient μ of the road surface decreases according to characteristics represented by, for example, a tanh function.

Figure 11:
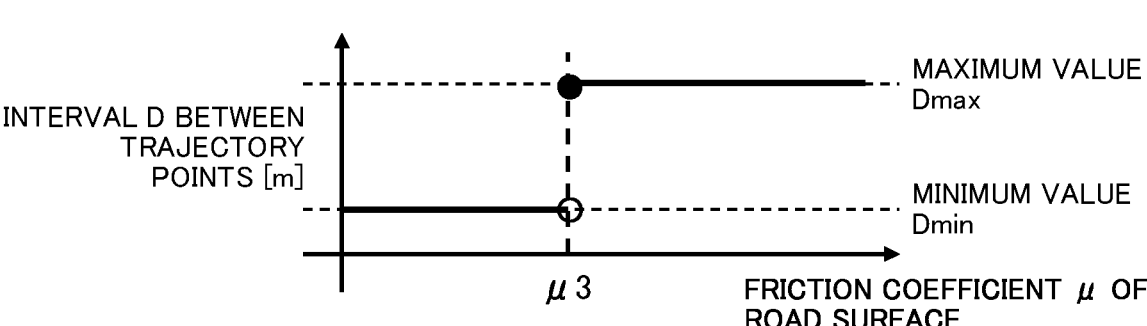
FIG. 11 is a diagram showing a third example of a mode for obtaining intervals between trajectory points based on the friction coefficient of a road surface.

FIG. 11 illustrates a mode in which trajectory point interval setting unit 513 switches intervals D between trajectory points to one of predetermined maximum value Dmax (in other words, the normal value) and predetermined minimum value Dmin (in other words, a distance less than the normal value) depending on whether friction coefficient μ of the road surface is greater than or less than a predetermined value μ3.

That is, trajectory point interval setting unit 513 may function not only in a mode in which intervals D between trajectory points are gradually increased and decreased according to changes in friction coefficient μ of a road surface but also in a mode in which intervals D between trajectory points are a variable that can take two different values depending on whether friction coefficient μ of the road surface is less than or greater than a threshold.

Fourth Embodiment

In a fourth embodiment, trajectory point interval setting unit 513 acquires, as information used as a setting condition and related to the driving environment of a driving road on which vehicle 100 travels, information related to the road shape, specifically, information related to the width of the driving road (in other words, a lane width or a road width), and decreases intervals D between trajectory points as the width of the driving road decreases.

Trajectory point interval setting unit 513 can acquire information on the road width by referring to map database 320 based on the positional information of vehicle 100 or from a roadside device via road-to-vehicle communication device 330.

Also, trajectory point interval setting unit 513 can acquire information on the road width that is obtained based on, for example, the positions of white lines (road markings), road shoulders, and road edges recognized by camera 340.

When the road width is narrow, compared to a case in which the road width is wide, it is necessary to increase the accuracy in tracking a target trajectory to prevent vehicle 100 from deviating from the lane.

Therefore, trajectory point interval setting unit 513 decreases intervals D between trajectory points as the road width decreases to accurately express the target trajectory.

This enables vehicle 100 traveling on a narrow road to accurately track a target trajectory and thereby makes it possible to prevent vehicle 100 from deviating from the lane.

Figure 12:
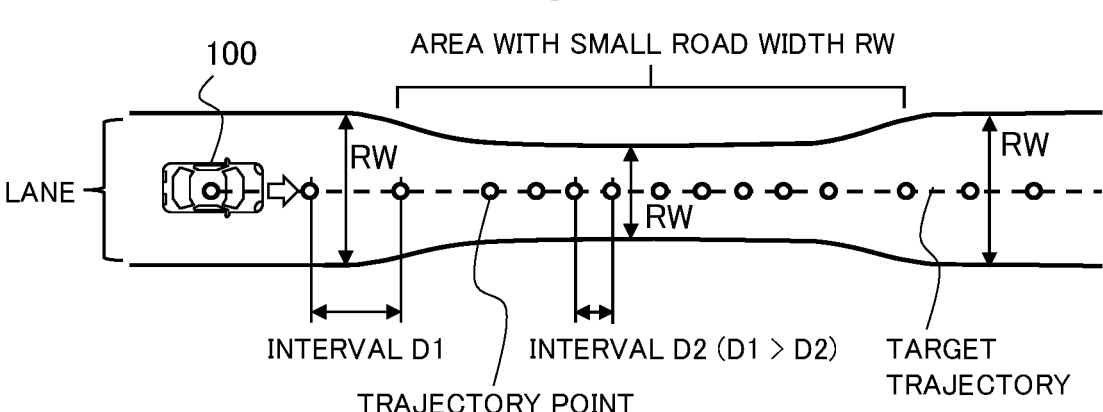
FIG. 12 is a diagram illustrating changes in intervals between trajectory points depending on the width of a driving road.

FIG. 12 illustrates changes in intervals D between trajectory points when a road width RW of an area of a straight road is small.

In this case, trajectory point interval setting unit 513 sets intervals D between trajectory points in the area with small road width RW to a value that is less than intervals D used in preceding and following areas with relatively large road width RW so that the target trajectory can be accurately expressed in the area with small road width RW.

As information on road width RW used to set intervals D between trajectory points, trajectory point interval setting unit 513 may use information on road width RW included in map data or information on road width RW obtained based on, for example, white line recognition.

Also, when road width RW available for vehicle 100 is reduced due to, for example, an obstacle, trajectory point interval setting unit 513 can use road width RW actually available for vehicle 100 to set intervals D between trajectory points.

Furthermore, when a target trajectory is set in a position shifted to the right or left from the center of a lane, trajectory point interval setting unit 513 may use the shorter one of distances from the target trajectory to the right and left road edges as information on road width RW.

Figure 13:
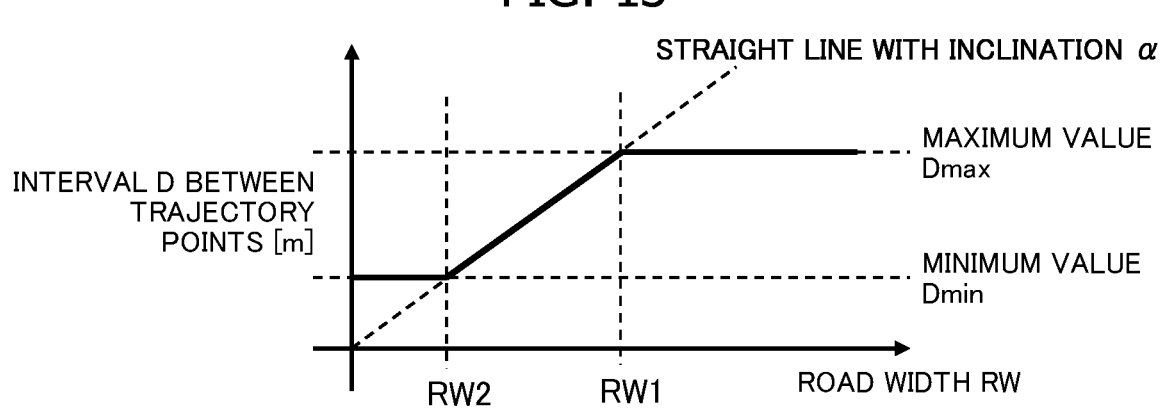
FIG. 13 is a diagram showing a first example of a mode for obtaining intervals between trajectory points based on the width of a driving road.

FIG. 13 illustrates a mode in which trajectory point interval setting unit 513 decreases intervals D between trajectory points in proportion to the decrease in road width RW of a driving road.

According to the mode illustrated in FIG. 13, trajectory point interval setting unit 513 sets intervals D between trajectory points to predetermined maximum value Dmax (in other words, the normal value) when road width RW of a driving road is greater than or equal to a first predetermined value RW1.

When road width RW of the driving road is less than first predetermined value RW1, trajectory point interval setting unit 513 decreases intervals D between trajectory points from predetermined maximum value Dmax in proportion to the decrease in road width RW.

When road width RW of the driving road is less than or equal to a second predetermined value RW2 that is less than first predetermined value RW1, trajectory point interval setting unit 513 sets intervals D between trajectory points to predetermined minimum value Dmin.

Changes in intervals D between trajectory points relative to changes in road width RW of the driving road are not necessarily in constant multiples.

Figure 14:
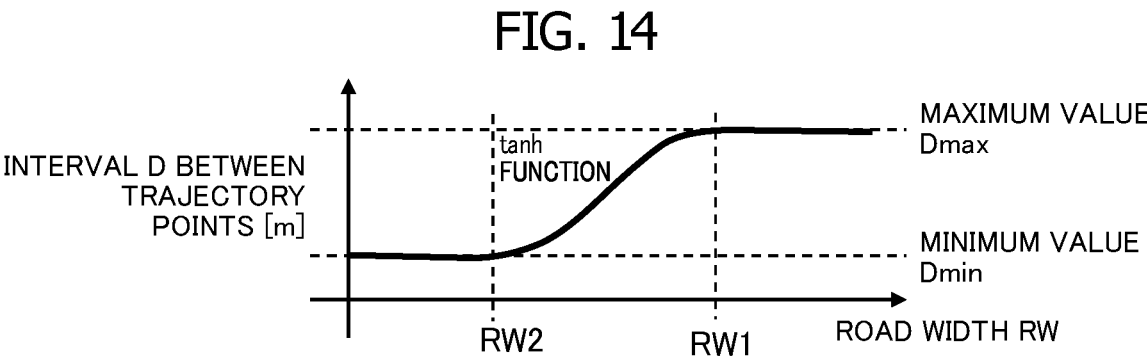
FIG. 14 is a diagram showing a second example of a mode for obtaining intervals between trajectory points based on the width of a driving road.

FIG. 14 illustrates an example in which the correlation between intervals D between trajectory points and road width RW of a driving road is represented by a tanh function so that intervals D change more smoothly relative to changes in road width RW.

Also in the mode illustrated in FIG. 14, trajectory point interval setting unit 513 sets intervals D between trajectory points to predetermined maximum value Dmax when road width RW is greater than or equal to first predetermined value RW1 and sets intervals D between trajectory points to predetermined minimum value Dmin when road width RW is less than or equal to second predetermined value RW2 (RW2<RW1).

In an area where road width RW is between first predetermined value RW1 and second predetermined value RW2, trajectory point interval setting unit 513 decreases intervals D between trajectory points as road width RW decreases according to characteristics represented by, for example, a tanh function.

Figure 15:
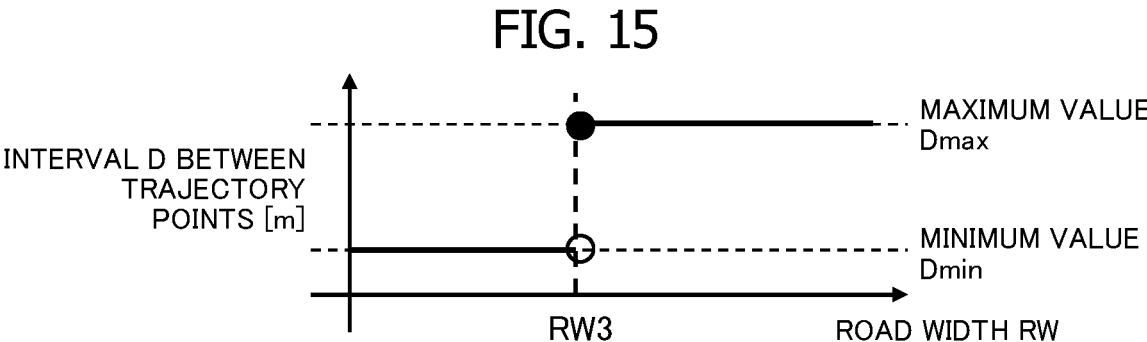
FIG. 15 is a diagram showing a third example of a mode for obtaining intervals between trajectory points based on the width of a driving road.

FIG. 15 illustrates a mode in which trajectory point interval setting unit 513 switches intervals D between trajectory points to one of predetermined maximum value Dmax (in other words, the normal value) and predetermined minimum value Dmin (in other words, a distance less than the normal value) depending on whether road width RW of a driving road is greater than or less than a predetermined value RW3.

That is, trajectory point interval setting unit 513 may function not only in a mode in which intervals D between trajectory points are gradually increased and decreased according to changes in road width RW of a driving road but also in a mode in which intervals D between trajectory points are a variable that can take two different values depending on whether road width RW of the driving road is less than or greater than a threshold.

Fifth Embodiment

In a fifth embodiment, trajectory point interval setting unit 513 acquires, as information used as a setting condition and related to the driving environment of a driving road on which vehicle 100 travels, information related to the road shape, specifically, information related to a change in curvature (in other words, curvature radius R) of a travel course of vehicle 100, and decreases intervals D between trajectory points as change in the curvature increases.

Here, a state in which change in the curvature of a travel course is large corresponds to a state in which the change in the steering angle (in other words, the tire angle) of vehicle 100 is large.

When change in the curvature of the travel course is large, trajectory point interval setting unit 513 sets intervals D between trajectory points to a value less than intervals D used when the change in the curvature is small to accurately express the shape of a target trajectory and thereby improve the accuracy in steering angle control.

Similarly to the first embodiment, the curvature of the travel course of vehicle 100 is a road curvature based on lane recognition or map data, or the curvature of a target trajectory (in other words, a target route).

Figure 16:
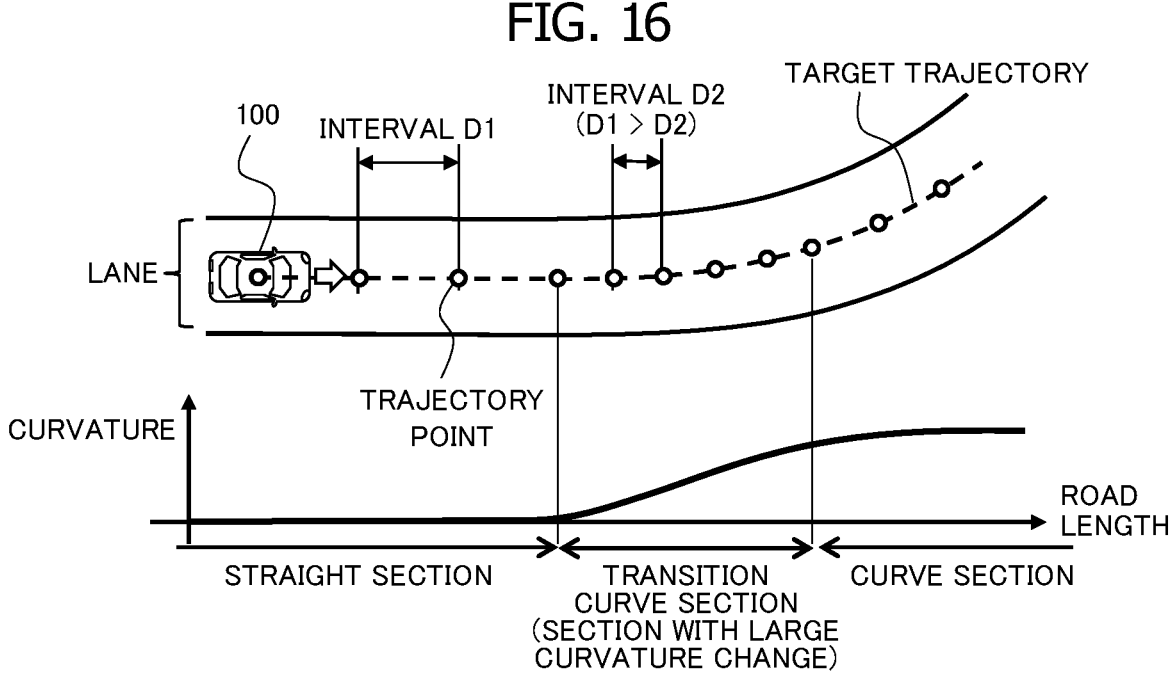
FIG. 16 is a diagram illustrating changes in intervals between trajectory points depending on the curvature change of a travel course.

FIG. 16 illustrates an example in which intervals D between trajectory points are changed according to the degree of change in the curvature when vehicle 100 travels along a straight section, a transition curve section, and a curve section, in this order.

In the straight section in which vehicle 100 travels in a straight line, because the change in the curvature is small, intervals D between trajectory points are set to a normal value D1.

When vehicle 100 enters a curve from the straight section and travels along the transition curve section, because change in the curvature (in other words, the change in the steering angle) is large, intervals D between trajectory points are changed to a value D2 that is less than normal value D1.

Then, when vehicle 100 starts to travel along the curve section in which the curvature is constant, because the change in the curvature is small, intervals D between trajectory points are returned to normal value D1 that is greater than value D2 in the transition curve section.

Figure 17:
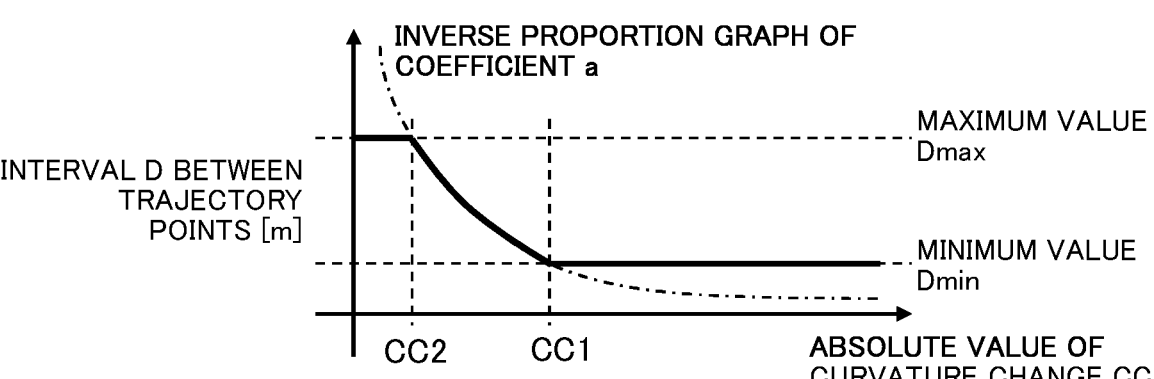
FIG. 17 is a diagram showing a first example of a mode for obtaining intervals between trajectory points based on a curvature change.

FIG. 17 illustrates a mode in which trajectory point interval setting unit 513 sets intervals D between trajectory points according to the absolute value of a curvature change CC. In this example, trajectory point interval setting unit 513 changes intervals D between trajectory points in inverse proportion to the absolute value of curvature change CC (intervals D between trajectory points=coefficient a/absolute value of curvature change CC).

In the mode illustrated in FIG. 17, trajectory point interval setting unit 513 sets intervals D between trajectory points to predetermined maximum value Dmax (in other words, the normal value) in an area where the absolute value of curvature change CC is less than a second predetermined value CC2, that is, an area where curvature change CC is sufficiently small.

On the other hand, trajectory point interval setting unit 513 sets intervals D between trajectory points to predetermined minimum value Dmin (in other words, a distance less than the normal value) in an area where the absolute value of curvature change CC is greater than a first predetermined value CC1 that is greater than second predetermined value CC2.

Also, trajectory point interval setting unit 513 changes intervals D between trajectory points in inverse proportion to the absolute value of curvature change CC in an area where the absolute value of curvature change CC is between second predetermined value CC2 and first predetermined value CC1.

Figure 18:
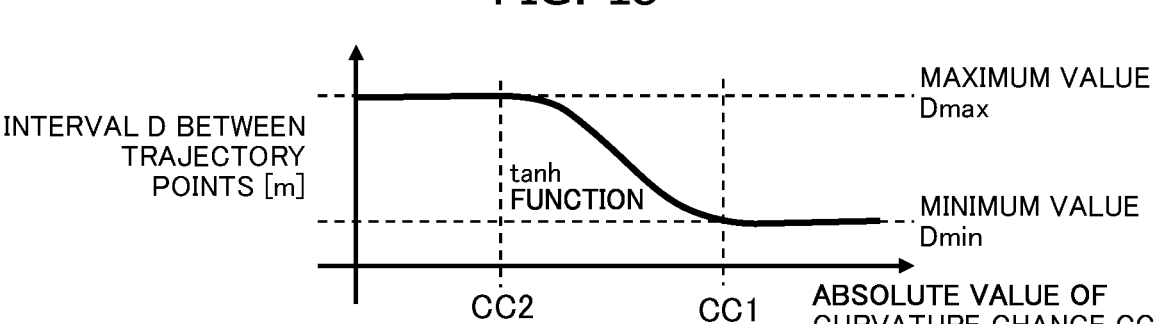
FIG. 18 is a diagram showing a second example of a mode for obtaining intervals between trajectory points based on a curvature change.

FIG. 18 illustrates a mode in which the correlation between intervals D between trajectory points and the absolute value of curvature change CC is represented by a tanh function so that intervals D change more smoothly relative to curvature change CC.

Also in the mode illustrated in FIG. 18, trajectory point interval setting unit 513 sets intervals D between trajectory points to predetermined maximum value Dmax in an area where the absolute value of curvature change CC is less than or equal to second predetermined value CC2 and sets intervals D between trajectory points to predetermined minimum value Dmin in an area where the absolute value of curvature change CC is greater than or equal to first predetermined value CC1 (CC2<CC1).

In an area where the absolute value of curvature change CC is between first predetermined value CC1 and second predetermined value CC2, trajectory point interval setting unit 513 decreases intervals D between trajectory points as the absolute value of curvature change CC increases according to characteristics represented by, for example, a tanh function.

Sixth Embodiment

In a sixth embodiment, trajectory point interval setting unit 513 acquires, as information used as a setting condition and related to the driving environment of a driving road on which vehicle 100 travels, information related to the distance from a leading vehicle traveling ahead of vehicle 100 on the driving road.

Trajectory point interval setting unit 513 decreases intervals D between trajectory points as the distance from the leading vehicle decreases, in other words, sets smaller intervals D in an area closer to the leading vehicle.

Trajectory point interval setting unit 513 can acquire the positional information of the leading vehicle recognized by camera 340 and can also acquire the positional information of the leading vehicle via vehicle-to-vehicle communication.

Figure 19:
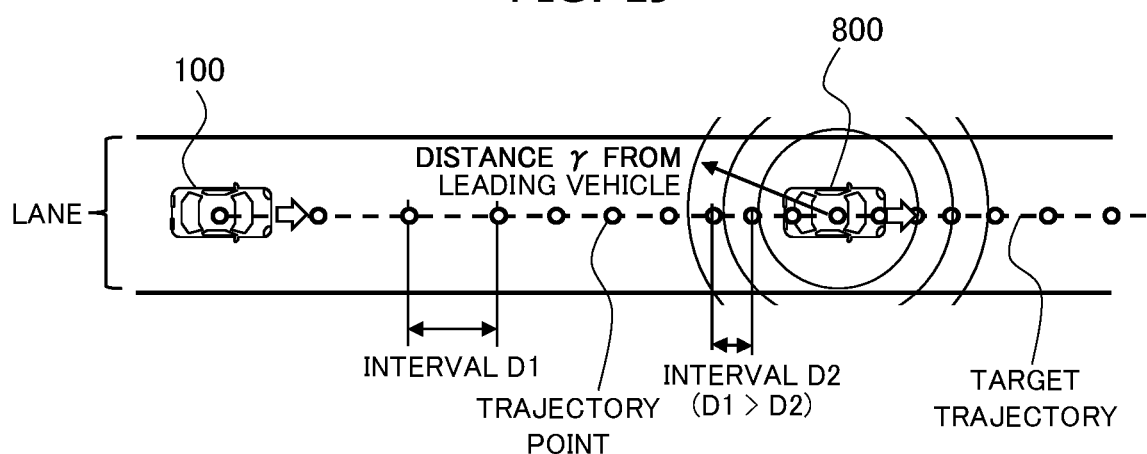
FIG. 19 is a diagram illustrating changes in intervals between trajectory points depending on the distance from a leading vehicle.

FIG. 19 illustrates an example in which intervals D between trajectory points are decreased as a distance γ from a leading vehicle 800 traveling ahead of vehicle 100 decreases.

Because intervals D between trajectory points in an area near leading vehicle 800 are set to a value less than intervals D at a position far from leading vehicle 800 (D1>D2), the target trajectory is accurately expressed and the accuracy in tracking the target trajectory is improved in the area near leading vehicle 800.

This makes it possible to accurately express the shape of a target trajectory when vehicle 100 comes close to leading vehicle 800 and the target trajectory needs to be accurately tracked, and thereby makes it possible to improve the accuracy in tracking the target trajectory.

Modes of determining intervals D between trajectory points according to distance γ from leading vehicle 800 are described below.

FIG. 20 illustrates a mode in which trajectory point interval setting unit 513 decreases intervals D between trajectory points in proportion to the decrease in distance γ from leading vehicle 800.

In the mode illustrated in FIG. 20, trajectory point interval setting unit 513 sets intervals D between trajectory points to predetermined maximum value Dmax in an area where distance γ from leading vehicle 800 is greater than or equal to a first predetermined value γ1, i.e., an area that is at a sufficient distance from leading vehicle 800.

On the other hand, in an area where distance γ from leading vehicle 800 is less than first predetermined value γ1, trajectory point interval setting unit 513 decreases intervals D between trajectory points from predetermined maximum value Dmax in proportion to the decrease in distance γ from leading vehicle 800 (in other words, as vehicle 100 comes closer to leading vehicle 800).

Also, trajectory point interval setting unit 513 sets intervals D between trajectory points to predetermined minimum value Dmin in an area where distance γ from leading vehicle 800 is less than or equal to a second predetermined value μ2 that is less than first predetermined value μ1, i.e., an area near leading vehicle 800.

That is, trajectory point interval setting unit 513 sets smaller intervals between trajectory points in an area closer to leading vehicle 800.

Seventh Embodiment

In a seventh embodiment, trajectory point interval setting unit 513 acquires, as information used as a setting condition and related to the driving environment of a driving road on which vehicle 100 travels, information related to the relative speed of vehicle 100 relative to a leading vehicle traveling ahead of vehicle 100 on the driving road.

Trajectory point interval setting unit 513 decreases intervals D between trajectory points as the relative speed increases, in other words, as the speed gap between vehicle 100 and the leading vehicle increases.

For example, trajectory point interval setting unit 513 can acquire information on the speed of the leading vehicle obtained from the positional information of the leading vehicle recognized by camera 340 and obtain the relative speed based on the acquired information.

The upper side of FIG. 21 illustrates intervals D1 between trajectory points when a speed VS1 of vehicle 100 is substantially the same as a speed VS2 of leading vehicle 800 or less than speed VS2 of leading vehicle 800.

The upper side of FIG. 21 illustrates intervals D2 between trajectory points when speed VS1 of vehicle 100 is greater than speed VS2 of leading vehicle 800, that is, when the relative speed of vehicle 100 relative to leading vehicle 800 is high.

Here, because trajectory point interval setting unit 513 decreases intervals D between trajectory points as the relative speed of vehicle 100 relative to leading vehicle 800 increases, intervals D2 are less than intervals D1 in the example of FIG. 21.

This makes it possible to accurately express the shape of a target trajectory and improve the accuracy in tracking the target trajectory when vehicle 100 is catching up with leading vehicle 800, in other words, when the inter-vehicle distance (or inter-vehicle time) between vehicle 100 and leading vehicle 800 is decreasing and the target trajectory needs to be accurately tracked.

FIG. 22 illustrates a mode in which trajectory point interval setting unit 513 sets intervals D between trajectory points according to a relative speed RV of vehicle 100 relative to the leading vehicle. In this example, trajectory point interval setting unit 513 changes intervals D between trajectory points in inverse proportion to relative speed RV (intervals D between trajectory points=coefficient b/relative speed RV).

In the mode illustrated in FIG. 22, trajectory point interval setting unit 513 sets intervals D between trajectory points to predetermined maximum value Dmax (in other words, the normal value) when relative speed RV is less than a second predetermined value RV2, that is, when the inter-vehicle distance remains constant or the inter-vehicle distance is increasing.

On the other hand, trajectory point interval setting unit 513 sets intervals D between trajectory points to predetermined minimum value Dmin (in other words, a distance less than the normal value) when relative speed RV is greater than a first predetermined value RV1 greater than second predetermined value RV2, that is, when vehicle 100 is rapidly approaching leading vehicle 800 and the inter-vehicle distance is rapidly decreasing.

Also, trajectory point interval setting unit 513 changes intervals D between trajectory points in inverse proportion to relative speed RV in an area where relative speed RV is between second predetermined value RV2 and first predetermined value RV1.

Eighth Embodiment

In an eighth embodiment, trajectory point interval setting unit 513 acquires, as information used as a setting condition and related to the driving environment of a driving road on which vehicle 100 travels, information related to the distance from vehicle 100 on the driving road and decreases intervals D between trajectory points as the distance from vehicle 100 decreases, in other words, sets shorter intervals D in an area closer to vehicle 100.

That is, trajectory point interval setting unit 513 decreases intervals D between trajectory points as the distance from vehicle 100 decreases based on the positional information of vehicle 100.

FIG. 23 illustrates an example in which intervals D between trajectory points are decreased as a distance $\delta$ from vehicle 100 decreases.

In FIG. 23, intervals D1, D2, and D3 represent intervals D between trajectory points at positions that are at different distances $\delta$ from vehicle 100. Distance $\delta$ corresponding to intervals D1 is the shortest, distance $\delta$ corresponding to intervals D2 is an intermediate value, and distance $\delta$ corresponding to intervals D3 is the longest.

Intervals D1, D2, and D3 satisfy D3>D2>D1, and FIG. 23 illustrates a mode in which intervals D between trajectory points are decreased as distance $\delta$ from vehicle 100 decreases.

That is, trajectory point interval setting unit 513 increases intervals D between trajectory points to reduce the computational load of microcomputer 510 in an area that is ahead of, and far from, vehicle 100, that is, an area through which vehicle 100 actually passes after a sufficient amount of time.

Reducing the computational load of microcomputer 510 makes it easier to respond to, for example, an obstacle hidden in a blind spot and changes in the driving environment such as a merging vehicle and an oncoming vehicle traveling out of its lane.

On the other hand, in an area that is immediately in front of vehicle 100 and through which vehicle 100 is going to pass soon, trajectory point interval setting unit 513 decreases intervals D between trajectory points to accurately express the shape of a target trajectory and improve the accuracy in tracking the target trajectory.

FIG. 24 illustrates a mode in which trajectory point interval setting unit 513 decreases the intervals between trajectory points in proportion to the decrease in distance $\delta$ from vehicle 100.

In the mode illustrated in FIG. 24, trajectory point interval setting unit 513 sets intervals D between trajectory points to predetermined maximum value Dmax in an area where distance $\delta$ from vehicle 100 is greater than or equal to a first predetermined value $\delta 1$.

Also, trajectory point interval setting unit 513 decreases intervals D between trajectory points from predetermined maximum value Dmax in proportion to the decrease in distance $\delta$ from vehicle 100 in an area where distance $\delta$ from vehicle 100 is less than first predetermined value $\delta 1$, and sets intervals D between trajectory points to predetermined minimum value Dmin in an area where distance $\delta$ from vehicle 100 is less than a second predetermined value $\delta 2$ that is less than first predetermined value $\delta 1$.

Changes in the intervals between trajectory points relative to changes in distance $\delta$ from vehicle 100 are not necessarily in constant multiples.

FIG. 25 illustrates an example in which the correlation between the intervals between trajectory points and distance $\delta$ from vehicle 100 is represented by a tanh function so that intervals D change more smoothly relative to changes in distance $\delta$.

Also in the mode illustrated in FIG. 25, trajectory point interval setting unit 513 sets intervals D between trajectory points to predetermined maximum value Dmax in an area where distance $\delta$ from vehicle 100 is greater than or equal to first predetermined value $\delta 1$, and sets intervals D between trajectory points to predetermined minimum value Dmin in an area where distance $\delta$ from vehicle 100 is less than second predetermined value $\delta 2$ ($\delta 2 < \delta 1$).

In an area where distance $\delta$ from vehicle 100 is between first predetermined value $\delta 1$ and second predetermined value $\delta 2$, trajectory point interval setting unit 513 decreases intervals D between trajectory points as distance $\delta$ from vehicle 100 decreases according to characteristics represented by, for example, a tanh function.

Figure 26:
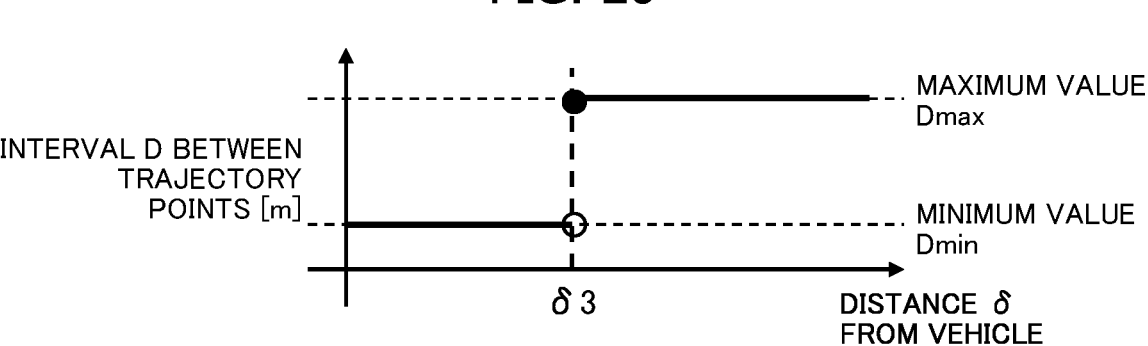
FIG. 26 is a diagram showing a third example of a mode for obtaining intervals between trajectory points based on the distance from a vehicle.

FIG. 26 illustrates a mode in which intervals D between trajectory points are changed to one of predetermined maximum value Dmax (in other words, the normal value) and predetermined minimum value Dmin (in other words, a distance less than the normal value) depending on whether distance $\delta$ from vehicle 100 is greater than or less than a predetermined value $\delta 3$ (predetermined value $\delta 3 > 0$ [m]).

That is, trajectory point interval setting unit 513 may function not only in a mode in which intervals D between trajectory points are gradually increased and decreased according to changes in distance $\delta$ from vehicle 100 but also in a mode in which intervals D between trajectory points is a variable that can take two different values depending on whether distance $\delta$ from vehicle 100 is greater than or less than a threshold.

Ninth Embodiment

In a ninth embodiment, trajectory point interval setting unit 513 acquires, as information used as a setting condition and related to a state of vehicle 100, information related to a motion state of vehicle 100, specifically, information related to a speed VS of vehicle 100, and decreases intervals D between trajectory points as speed VS of vehicle 100 decreases.

When speed VS of vehicle 100 is low, the accuracy of vehicle 100 in tracking a trajectory may decrease because the distance that vehicle 100 travels per unit time decreases and the time required to reach from a given trajectory point to the next trajectory point increases.

Therefore, trajectory point interval setting unit 513 decreases intervals D between trajectory points as speed VS of vehicle 100 decreases to maintain the trajectory tracking accuracy even when vehicle 100 is traveling at a low speed.

When determining intervals D between trajectory points based on the speed of vehicle 100, trajectory point interval setting unit 513 may use modes represented by, for example, graphs that are obtained by changing distance $\delta$ from vehicle 100 represented by the horizontal axis in each of FIGS. 24-26 to speed VS of vehicle 100.

Speed VS of vehicle 100 may be either a target speed or an actual speed.

Also, trajectory point interval setting unit 513 may obtain, as information related to speed VS of vehicle 100, a target speed that is set by target trajectory generation unit 512 as information related to a target trajectory or a measurement of a speed that is calculated based on the rotational speeds of wheels 101-104 detected by wheel speed sensor 410.

Figure 27:
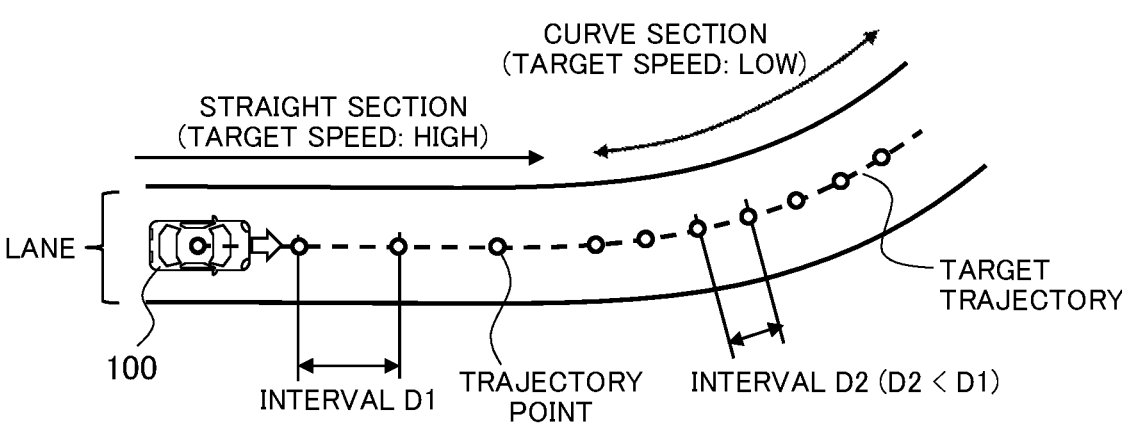
FIG. 27 is a diagram illustrating changes in intervals between trajectory points depending on a target speed.

FIG. 27 illustrates an example in which trajectory point interval setting unit 513 sets intervals D between trajectory points based on a target speed that is set as information related to a target trajectory. In this example, intervals D between trajectory points are changed according to the target speed when vehicle 100 is going to travel along a curve section after traveling along a straight section.

When vehicle 100 is going to travel along a curve section after traveling along a straight section, in setting a target trajectory, the target speed in the curve section is generally set to a value lower than the target speed in the straight section.

Therefore, trajectory point interval setting unit 513 sets intervals D between trajectory points based on the target speed so that intervals D2 in the curve section, in which the target speed is less than the target speed in the straight section, become less than intervals D1 in the straight section in which the target speed is higher.

Figure 28:
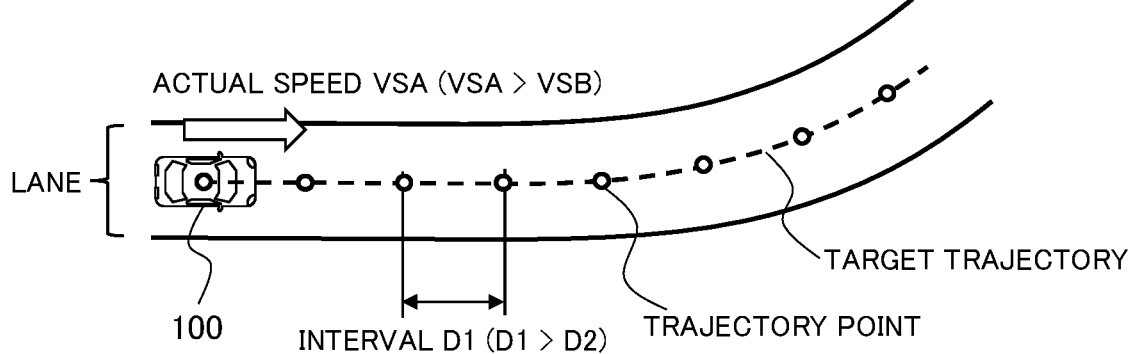
FIG. 28 is a diagram illustrating intervals between trajectory points when the actual speed is high.
Figure 29:
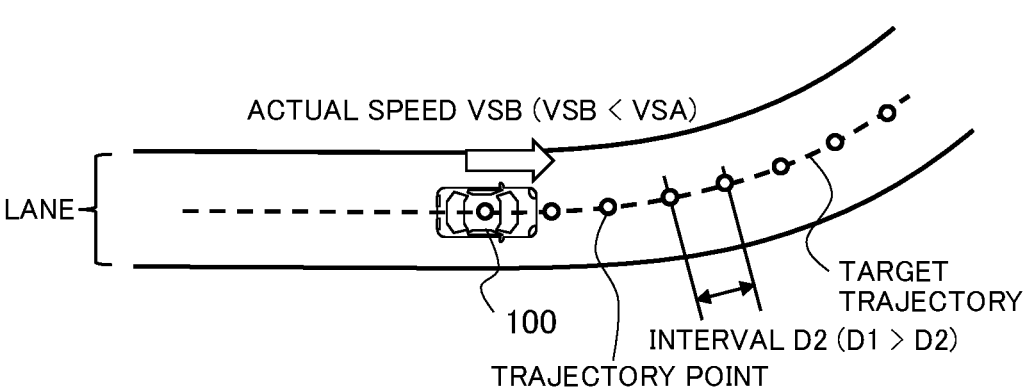
FIG. 29 is a diagram illustrating intervals between trajectory points when the actual speed is low.

FIGS. 28 and 29 illustrate an example in which trajectory point interval setting unit 513 sets intervals D between trajectory points based on measurements of speed VS (in other words, actual speeds) of vehicle 100.

FIG. 28 illustrates a state in which vehicle 100 is traveling along a straight section before a curve section, and intervals D are set to intervals D1 based on an actual speed VSA of vehicle 100.

FIG. 29 illustrates a state in which vehicle 100 has slowed down to prepare for traveling in the curve section.

An actual speed VSB of vehicle 100 in the curve section is less than actual speed VSA in the straight section, and intervals D2 set based on actual speed VSB are less than intervals D1 in the straight section.

When the intervals between trajectory points are defined by time instead of distance and the time intervals between trajectory points are constant, the distance intervals between trajectory points decrease as speed VS of vehicle 100 decreases.

However, control based on constant time intervals is different from control in which the distance intervals are changed based on speed VS of vehicle 100. That is, the distance intervals in the control based on the constant time intervals are uniquely determined as a result of multiplying speed VS by the time intervals, and changes in the distance intervals are merely results of changes in speed VS of vehicle 100.

Therefore, with the control based on constant time intervals, it is not possible to intentionally set the correlation between speed VS and the distance intervals, and it is difficult to optimize the distance intervals according to speed VS.

That is, setting intervals D (i.e., distance intervals) according to speed VS as described in the ninth embodiment is a technique that is different from the control based on constant time intervals.

Tenth Embodiment

In a tenth embodiment, trajectory point interval setting unit 513 acquires, as information used as a setting condition and related to a motion state of vehicle 100, information related to the lateral jerk of vehicle 100, and decreases intervals D between trajectory points as the lateral jerk of vehicle 100 increases.

Trajectory point interval setting unit 513 can acquire information on the lateral jerk that is obtained from information on lateral acceleration detected by acceleration sensor 420.

Figure 30:
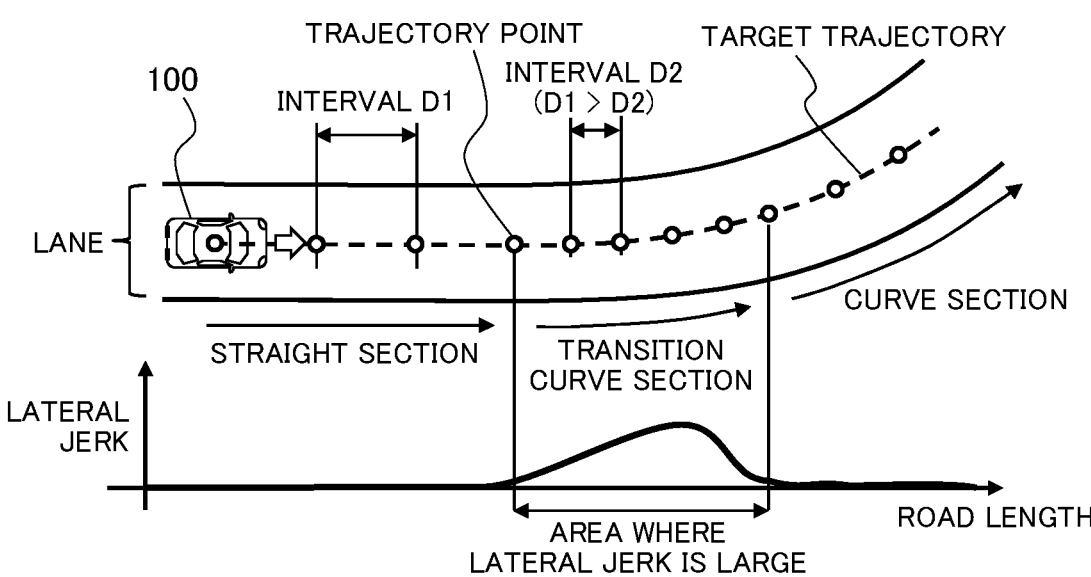
FIG. 30 is a diagram illustrating changes in intervals between trajectory points depending on a lateral jerk.

FIG. 30 illustrates an example in which intervals D between trajectory points are changed according to changes in the lateral jerk of vehicle 100.

When vehicle 100 enters a curve from a straight section, the lateral jerk increases as the curvature changes in a transition curve section. Then, when vehicle 100 starts to travel through a curve section in which the curvature is constant, the lateral jerk decreases.

In this case, when the lateral jerk of vehicle 100 increases in the transition curve section, trajectory point interval setting unit 513 sets intervals D to intervals D2 that are less than intervals D1 in the straight section before the transition curve section. Then, when vehicle 100 enters the curve section and the lateral jerk decreases, trajectory point interval setting unit 513 sets intervals D to a value greater than intervals D2 in the transition curve section.

Here, a state in which the lateral jerk of vehicle 100 is large corresponds to a state in which the change in the steering angle of vehicle 100 is large.

Therefore, trajectory point interval setting unit 513 decreases intervals D between trajectory points to accurately express the shape of a target trajectory and thereby improve the accuracy in steering angle control.

Here, because the lateral jerk of vehicle 100 increases as the change rate of the steering angle increases, information on the change rate of the steering angle corresponds to information related to the lateral jerk of vehicle 100.

Accordingly, trajectory point interval setting unit 513 may be configured to decrease intervals D between trajectory points as the change rate of the steering angle, instead of the lateral jerk of vehicle 100, increases.

This configuration also provides effects similar to those provided when intervals D between trajectory points are set based on the lateral jerk of vehicle 100.

Figure 31:
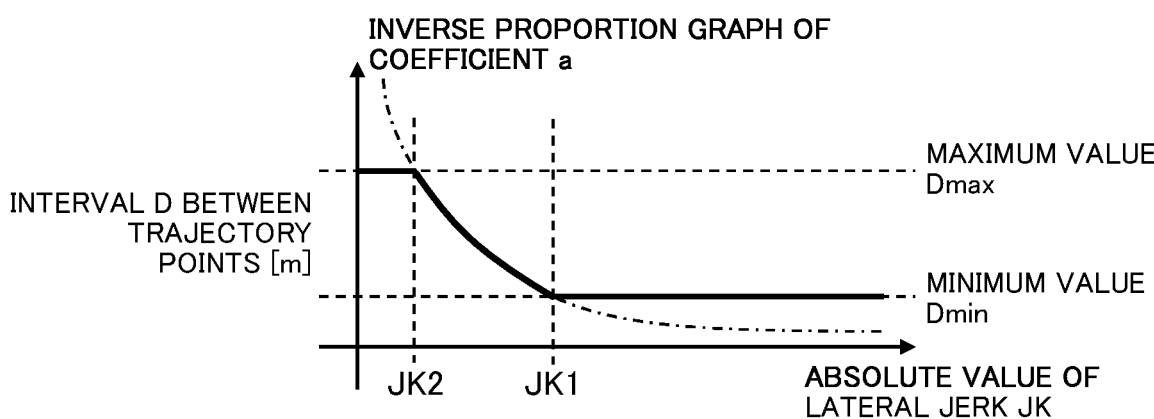
FIG. 31 is a diagram showing a first example of a mode for obtaining intervals between trajectory points based on a lateral jerk.

FIG. 31 illustrates a mode in which trajectory point interval setting unit 513 sets intervals D between trajectory points according to the absolute value of a lateral jerk JK of vehicle 100. In this example, trajectory point interval setting unit 513 changes intervals D between trajectory points in inverse proportion to the absolute value of jerk JK (intervals D between trajectory points=factor a/absolute value of jerk JK).

In the mode illustrated in FIG. 31, trajectory point interval setting unit 513 sets intervals D between trajectory points to predetermined maximum value Dmax (in other words, the normal value) when the absolute value of jerk JK is less than a second predetermined value JK2, that is, when the change in the lateral (or horizontal) acceleration is sufficiently small.

On the other hand, trajectory point interval setting unit 513 sets intervals D between trajectory points to predetermined minimum value Dmin (in other words, a distance less than the normal value) when the absolute value of jerk JK is greater than a first predetermined value JK1 that is greater than second predetermined value JK2.

In an area where the absolute value of jerk JK is between second predetermined value JK2 and first predetermined value JK1, trajectory point interval setting unit 513 changes intervals D between trajectory points in inverse proportion to the absolute value of jerk JK.

Figure 32:
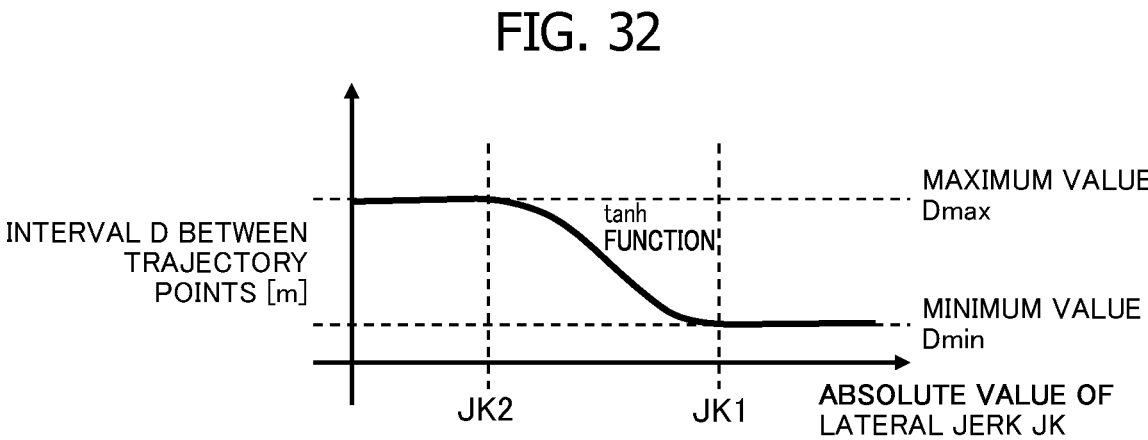
FIG. 32 is a diagram showing a second example of a mode for obtaining intervals between trajectory points based on a lateral jerk.

FIG. 32 illustrates an example in which the correlation between intervals D between trajectory points and the absolute value of jerk JK is represented by a tanh function so that intervals D change more smoothly relative to changes in jerk JK.

Also in the mode illustrated in FIG. 32, trajectory point interval setting unit 513 sets intervals D between trajectory points to predetermined maximum value Dmax when the absolute value of jerk JK is less than or equal to second predetermined value JK2 and sets intervals D between trajectory points to predetermined minimum value Dmin when the absolute value of jerk JK is greater than or equal to first predetermined value JK1 (JK2<JK1).

In an area where the absolute value of jerk JK is between first predetermined value JK1 and second predetermined value JK2, trajectory point interval setting unit 513 decreases intervals D between trajectory points as the absolute value of jerk JK increases according to characteristics represented by, for example, a tanh function.

Eleventh Embodiment

In an eleventh embodiment, trajectory point interval setting unit 513 acquires, as information used as a setting condition and related to a motion state of vehicle 100, information related to the steering angle of vehicle 100, and decreases intervals D between trajectory points as the steering angle of vehicle 100 increases.

The steering angle is a tire steering angle and represents an angle between the center planes of road wheels being steered and the longitudinal axis of vehicle 100.

Trajectory point interval setting unit 513 acquires, as a setting condition for intervals D between trajectory points, a target steering angle for causing vehicle 100 to track a target trajectory or an actual steering angle detected by steering angle sensor 430.

Figure 33:
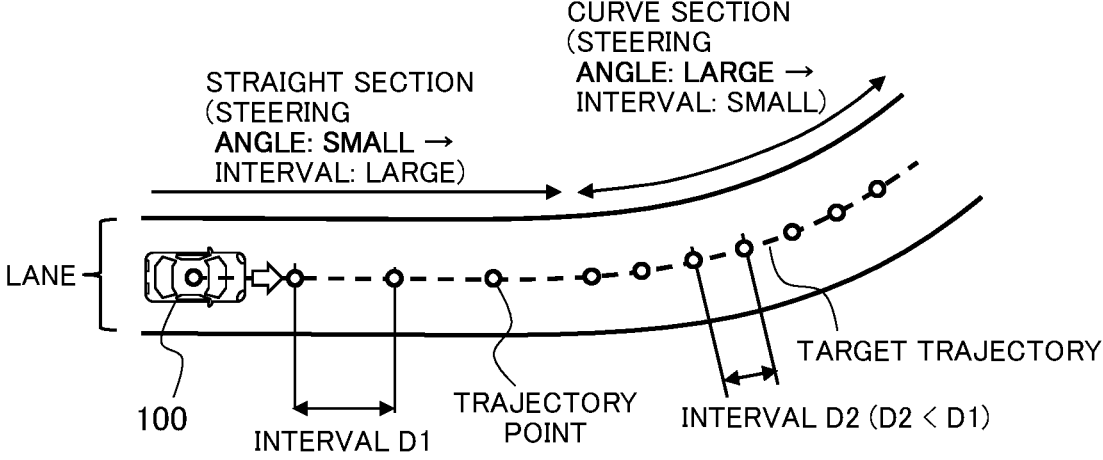
FIG. 33 is a diagram illustrating changes in intervals between trajectory points depending on a steering angle.

FIG. 33 illustrates an example in which intervals D between trajectory points are changed according to changes in the steering angle of vehicle 100.

Because the steering angle is small when vehicle 100 travels along a straight section, trajectory point interval setting unit 513 sets intervals D between trajectory points to relatively large intervals D1.

When vehicle 100 enters a curve section from the straight section and the steering angle increases, trajectory point interval setting unit 513 sets intervals D between trajectory points to intervals D2 that are less than intervals D1 used in the straight section in which the steering angle is small.

Here, a state in which the steering angle of vehicle 100 is large corresponds to a state in which vehicle 100 is traveling a curve with a large curvature. In this state, if intervals D between trajectory points are too large, it is not possible to accurately express the shape of the curve (or a target trajectory).

Therefore, trajectory point interval setting unit 513 decreases intervals D between trajectory points as the steering angle of vehicle 100 increases to improve the trajectory tracking accuracy of vehicle 100 traveling along a curve.

In steering angle control for tracking a target trajectory, a yaw rate or lateral acceleration may be used as a control target.

That is, trajectory point interval setting unit 513 can set intervals D between trajectory points based on a yaw rate or lateral acceleration instead of information on the steering angle.

More specifically, trajectory point interval setting unit 513 may decrease intervals D between trajectory points as the yaw rate of vehicle 100 increases.

Also, trajectory point interval setting unit 513 may decrease intervals D between trajectory points as the lateral acceleration of vehicle 100 increases.

Thus, information related to a steering angle is one of a steering angle, a yaw rate, or lateral acceleration.

Figure 34:
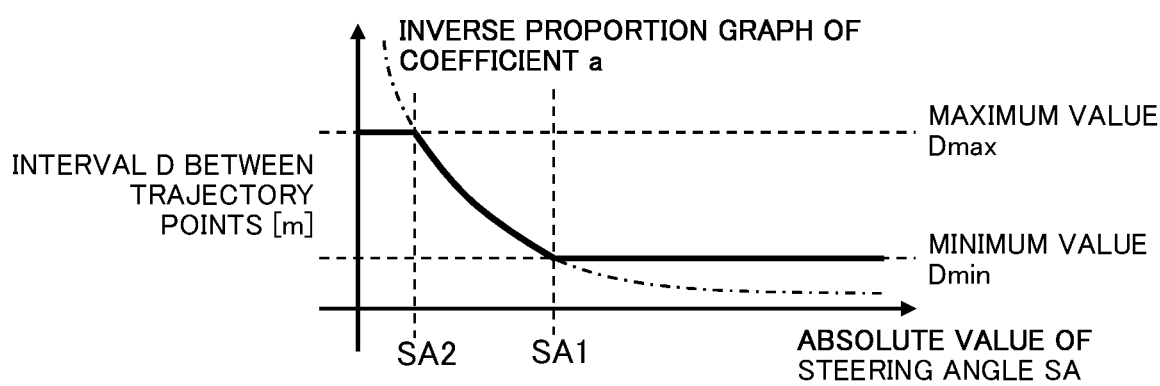
FIG. 34 is a diagram showing a first example of a mode for obtaining intervals between trajectory points based on a steering angle.

FIG. 34 illustrates a mode in which trajectory point interval setting unit 513 sets intervals D between trajectory points according to the absolute value of steering angle SA of vehicle 100. In this example, trajectory point interval setting unit 513 changes intervals D between trajectory points in inverse proportion to the absolute value of steering angle SA (intervals D between trajectory points=factor a/absolute value of steering angle SA).

In the mode illustrated in FIG. 34, trajectory point interval setting unit 513 sets intervals D between trajectory points to predetermined maximum value Dmax (in other words, the normal value) when the absolute value of steering angle SA is less than a second predetermined value SA2, i.e., when vehicle 100 is traveling in a substantially straight line.

On the other hand, trajectory point interval setting unit 513 sets intervals D between trajectory points to predetermined minimum value Dmin (in other words, a distance less than the normal value) when the absolute value of steering angle SA is greater than a first predetermined value SA1 that is greater than second predetermined value SA2, i.e., when vehicle 100 is traveling along a curve.

In an area where the absolute value of steering angle SA is between second predetermined value SA2 and first predetermined value SA1, trajectory point interval setting unit 513 changes intervals D between trajectory points in inverse proportion to the absolute value of steering angle SA.

Figure 35:
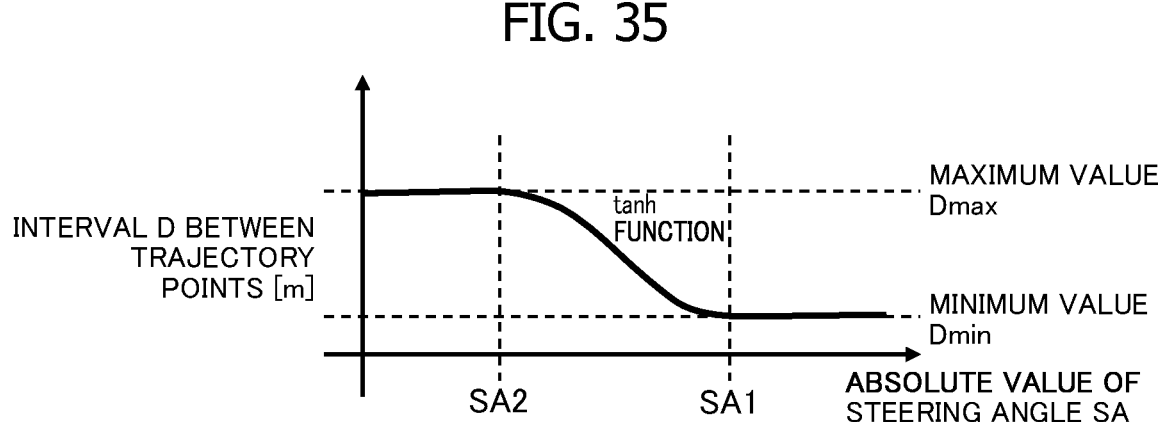
FIG. 35 is a diagram showing a second example of a mode for obtaining intervals between trajectory points based on a steering angle.

FIG. 35 illustrates a mode in which the correlation between intervals D between trajectory points and the absolute value of steering angle SA is represented by a tanh function so that intervals D change more smoothly relative to changes in steering angle SA.

Also in the mode illustrated in FIG. 35, trajectory point interval setting unit 513 sets intervals D between trajectory points to predetermined maximum value Dmax when the absolute value of steering angle SA is less than or equal to second predetermined value SA2, and sets intervals D between trajectory points to predetermined minimum value Dmin when the absolute value of steering angle SA is greater than or equal to first predetermined value SA1 (SA2<SA1).

Also, in an area where the absolute value of steering angle SA is between first predetermined value SA1 and second predetermined value SA2, trajectory point interval setting unit 513 decreases intervals D between trajectory points as the absolute value of steering angle SA increases according to characteristics represented by, for example, a tanh function.

Twelfth Embodiment

In a twelfth embodiment, trajectory point interval setting unit 513 acquires information related to the recognition accuracy of environment recognition unit 300 as information related to a state of vehicle 100, and decreases intervals D between trajectory points as the recognition accuracy of environment recognition unit 300 decreases.

The recognition accuracy of environment recognition unit 300, which is acquired by trajectory point interval setting unit 513 as a setting condition for intervals D between trajectory points, indicates the capability of identifying a physical quantity, such as the accuracy of camera 340 or radar 350 in measuring a distance.

Here, information on the recognition accuracy of environment recognition unit 300 may be stored in a non-volatile memory of microcomputer 510 as a specification of vehicle 100, and trajectory point interval setting unit 513 may read the information on the recognition accuracy from the non-volatile memory.

Also, information on the recognition accuracy may be provided for each unit distance from environment recognition unit 300.

For example, microcomputer 510 may have a function to obtain the recognition accuracy of environment recognition unit 300 by comparing a length or a distance measured by environment recognition unit 300 with a predetermined value.

Specifically, microcomputer 510 can obtain the recognition accuracy (in other words, a measurement error) of environment recognition unit 300 based on measurement results of environment recognition unit 300, such as the distance to an inter-vehicle distance confirmation sign provided on a freeway or the length of a white dashed line defining a lane.

For example, trajectory point interval setting unit 513 may categorize the level of a measurement error of a length measured by environment recognition unit 300 into one of multiples levels, such as +0.01 m, +0.05 m, and +0.1 m; and may decrease intervals D between trajectory points as the measurement error of the length increases, that is, as the recognition accuracy of environment recognition unit 300 decreases.

Also, for example, trajectory point interval setting unit 513 may acquire information on the distance from vehicle 100 and information on the recognition accuracy of environment recognition unit 300, and may set shorter intervals D between trajectory points in an area closer to vehicle 100 among areas with the same recognition accuracy.

Figure 36:
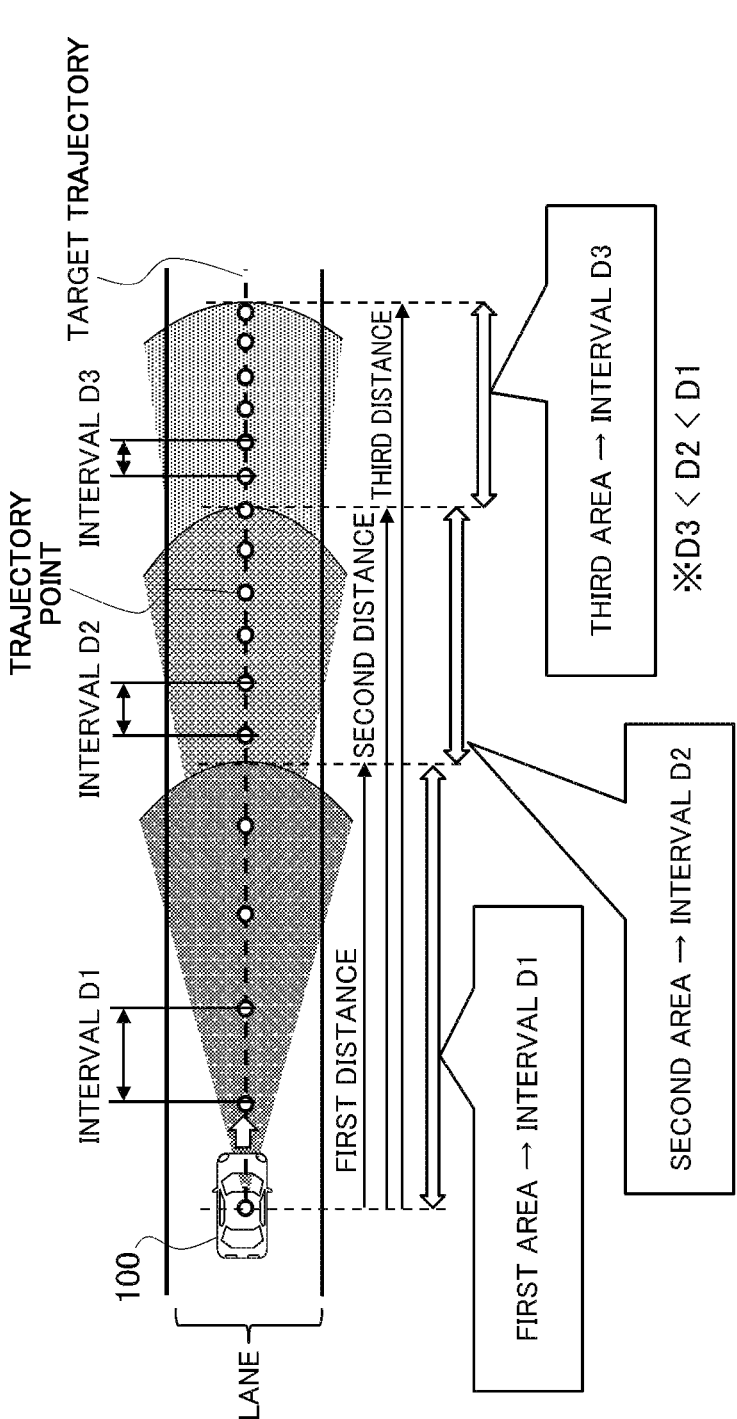
FIG. 36 is a diagram illustrating changes in intervals between trajectory points depending on a measurement error (recognition accuracy).

FIG. 36 illustrates an example in which intervals D between trajectory points are changed according to differences in the recognition accuracy of environment recognition unit 300.

In this example, trajectory point interval setting unit 513 categorizes the recognition accuracy of environment recognition unit 300 into one of three levels: high, medium, and low; and sets shorter intervals D between trajectory points in an area with lower recognition accuracy.

In other words, trajectory point interval setting unit 513 categorizes the measurement error of environment recognition unit 300 into one of three levels: large, medium, and small, such as +0.01 m, +0.05 m, and +0.1 m; and sets shorter intervals D between trajectory points in an area with a larger measurement error.

That is, trajectory point interval setting unit 513 sets intervals D between trajectory points to a small value in an area where the recognition accuracy of environment recognition unit 300 is low or an area where the measurement error of environment recognition unit 300 is large to accurately express the shape of a trajectory and improve the accuracy in tracking the trajectory.

In the example illustrated in FIG. 36, within the recognition range of environment recognition unit 300, a first area is from vehicle 100 to a first distance and has highest recognition accuracy, a second area is from the first distance to a second distance (second distance>first distance) and has medium recognition accuracy, and a third area is from the second distance to a third distance (third distance>second distance) and has lowest recognition accuracy.

That is, the measurement error in the first area is +0.01 m, the measurement error in the second area is +0.05 m, and the measurement error in the third area is +0.1 m.

Trajectory point interval setting unit 513 sets intervals D between trajectory points to longest intervals D1 in the first area, sets intervals D between trajectory points to medium intervals D2 in the second area, and sets intervals D between trajectory points to shortest intervals D3 in the third area (D3<D2<D1).

Figures 37, 38:
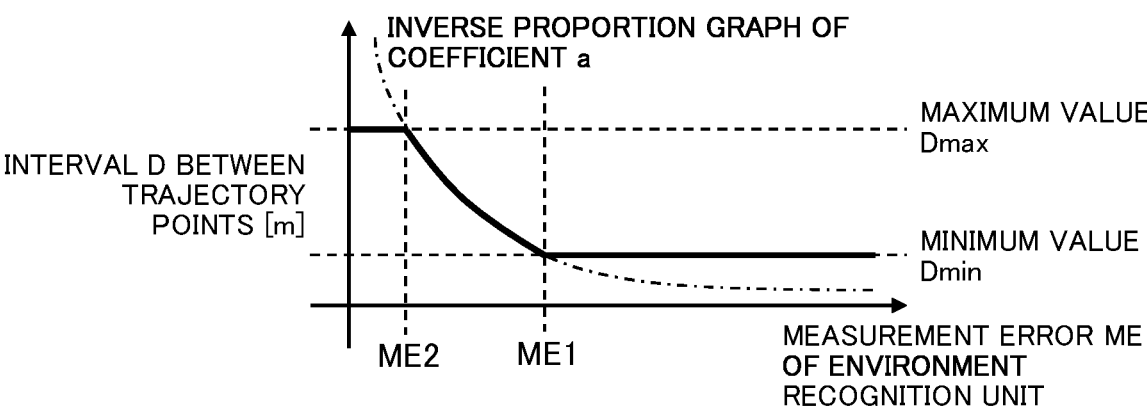
FIG. 37 is a diagram showing an example of a mode for obtaining intervals between trajectory points based on a measurement error.
FIG. 38 is a diagram for describing a method of setting a trajectory point.

FIG. 37 illustrates a mode in which trajectory point interval setting unit 513 sets intervals D between trajectory points according to the recognition accuracy of environment recognition unit 300. In this example, trajectory point interval setting unit 513 changes intervals D between trajectory points in inverse proportion to the measurement error (intervals D between trajectory points=coefficient a/measurement error).

In the mode illustrated in FIG. 37, trajectory point interval setting unit 513 sets intervals D between trajectory points to predetermined maximum value Dmax (in other words, the normal value) in an area where measurement error ME of environment recognition unit 300 is less than a second predetermined value ME2, i.e., an area where the recognition accuracy of environment recognition unit 300 is high.

On the other hand, trajectory point interval setting unit 513 sets intervals D between trajectory points to predetermined minimum value Dmin (in other words, a distance less than the normal value) in an area where measurement error ME of environment recognition unit 300 is greater than a first predetermined value ME1 that is greater than second predetermined value ME2, i.e., an area where the recognition accuracy of environment recognition unit 300 is low.

Also, trajectory point interval setting unit 513 changes intervals D between trajectory points in inverse proportion to measurement error ME of environment recognition unit 300 in an area where measurement error ME is between second predetermined value ME2 and first predetermined value ME1.

Thirteenth Embodiment

In a thirteenth embodiment, trajectory point interval setting unit 513 acquires, as setting conditions, multiple information items related to the driving environment or the state of a vehicle and sets intervals D between trajectory points based on a combination of multiple different setting conditions.

Specifically, trajectory point interval setting unit 513 sets intervals D between trajectory points for each of multiple different setting conditions and determines intervals D between trajectory points through a select low process in which the smallest one of multiple intervals D is selected as final intervals D between trajectory points.

For example, trajectory point interval setting unit 513 sets intervals D between trajectory points based on a combination of three setting conditions including the curvature of a travel course, the recognition accuracy of environment recognition unit 300, and speed VS of vehicle 100.

That is, trajectory point interval setting unit 513 decreases intervals D_C between trajectory points as the curvature of a travel course increases as described in the first embodiment.

Also, trajectory point interval setting unit 513 decreases intervals D_ME between trajectory points as the recognition accuracy of environment recognition unit 300 decreases (in other words, as measurement error ME increases) as described in the twelfth embodiment.

Furthermore, trajectory point interval setting unit 513 decreases intervals D_VS between trajectory points as speed VS of vehicle 100 decreases as described in the ninth embodiment.

Then, trajectory point interval setting unit 513 performs a select low process to select shortest intervals D among intervals D_C, intervals D_ME, and intervals D_VS and provides information on the selected intervals D to target trajectory generation unit 512.

The method with which trajectory point interval setting unit 513 determines final intervals D from intervals D between trajectory points obtained based on multiple setting conditions is not limited to the select low process.

For example, trajectory point interval setting unit 513 can determine final intervals D from multiple intervals D obtained based on respective setting conditions by using a process of obtaining an average value, a process of obtaining a median value, or a process of obtaining a least square deviation.

Also, trajectory point interval setting unit 513 can determine final intervals D based on a combination of a main setting condition and a sub setting condition.

For example, trajectory point interval setting unit 513 selects one or more main setting conditions and inputs signals indicating intervals D obtained based on the main setting conditions to the select low process.

Trajectory point interval setting unit 513 also selects one or more sub setting conditions, inputs only signals indicating intervals D that are obtained based on the sub setting conditions and less than a predetermined threshold to the select low process, and does not use intervals D that are obtained based on the sub setting conditions but are greater than or equal to the predetermined threshold in the select low process.

Then, trajectory point interval setting unit 513 determines final intervals D based on an output signal from the select low process and uses final intervals D to generate a target trajectory.

For example, trajectory point interval setting unit 513 may use the curvature of a driving road and the distance from a leading vehicle as main setting conditions and use the relative speed of vehicle 100 relative to a leading vehicle as a sub setting condition.

Also, trajectory point interval setting unit 513 may set a separate threshold of intervals D for each sub setting condition to determine whether to use intervals D obtained based on the sub setting condition in the select low process.

When, for example, trajectory point interval setting unit 513 sets intervals D between trajectory points based on the actual speed of vehicle 100 as described in the ninth embodiment (see FIGS. 28 and 29), intervals D between trajectory points changes according to changes in the actual speed of vehicle 100. In this case, a trajectory may not be accurately expressed even when a high trajectory tracking performance is required, and the tracking performance may be reduced.

Here, when the actual speed of vehicle 100 decreases, because the same trajectory is expressed by trajectory points arranged at shorter intervals D, the shape of the trajectory can be accurately expressed, and the decrease in the tracking performance is prevented.

However, when the actual speed of vehicle 100 increases, because the same trajectory is expressed by trajectory points arranged at longer intervals D, the expression of the shape of the trajectory may suddenly become rough, and the tracking performance may temporarily decrease.

For this reason, when a portion of a target trajectory set based on longer intervals D is superimposed on the same portion of the target trajectory set based on previous shorter intervals D and multiple trajectory points set based on previous shorter intervals D exist between new trajectory points set based on longer intervals D (in other words, when intervals D between trajectory points are suddenly increased), target trajectory generation unit 512 may additionally use some of the trajectory points set based on previous shorter intervals D.

In this case, target trajectory generation unit 512 adds some of the trajectory points set based on previous shorter intervals D to the new trajectory points set based on longer intervals D to generate a target trajectory defined by these trajectory points.

With this configuration, even when a command to suddenly increase intervals D between trajectory points is output from trajectory point interval setting unit 513, target trajectory generation unit 512 can prevent the intervals between trajectory points representing a target trajectory from suddenly increasing and can thereby prevent the decrease in the trajectory tracking performance.

Also, trajectory point interval setting unit 513 can perform a process of delaying the increase in information on intervals D to be output to target trajectory generation unit 512. This also makes it possible to prevent the trajectory tracking performance from decreasing as a result of a sudden increase in the intervals between trajectory points.

Methods of setting trajectory points performed by microcomputer 510 (target trajectory generation unit 512 and trajectory point interval setting unit 513) are described below.

[First Trajectory point Setting Method]

FIG. 38 is a state diagram illustrating the outline of a first trajectory point setting method, and FIG. 39 is a flowchart illustrating the first trajectory point setting method. The first trajectory point setting method is described with reference to FIGS. 38 and 39.

First, microcomputer 510 sets a first trajectory point (in other words, a start point) in front of vehicle 100 (step S901) and sets the first trajectory point as a target point (step S902).

Next, microcomputer 510 sets intervals D between trajectory points based on information related to the driving environment of a driving road and/or information related to a state of vehicle 100 (step S903).

Then, microcomputer 510 sets the next trajectory point at a position that is away from the target point by intervals D (step S904) and sets the newly set trajectory point as a target point (step S905).

Next, microcomputer 510 determines whether the length of a target trajectory represented by a series of trajectory points is greater than or equal to a predetermined length (step S906).

When the length of the target trajectory is less than the predetermined length, microcomputer 510 repeats the process of determining intervals D between trajectory points (step S903), the process of setting the next trajectory point at a position away from the target point by intervals D (step S904), and the process of setting the newly determined trajectory point as a target point (step S905).

On the other hand, when the length of the target trajectory reaches the predetermined length, microcomputer 510 stops setting a new trajectory point.

The first trajectory point setting method may be regarded as a process of sampling trajectory points to be actually used for a set target trajectory or as a process of setting a target trajectory and trajectory points at the same time.

[Second Trajectory Point Setting Method]

Microcomputer 510 can set an evaluation function for intervals D between trajectory points and optimize a target trajectory based on the evaluation function.

In this case, microcomputer 510 uses, as a target value, intervals D between trajectory points that are set based on information related to the driving environment of a driving road and/or information related to a state of vehicle 100.

Next, microcomputer 510 designs an evaluation function such that intervals D between trajectory points representing a target trajectory come close to the target value.

Then, microcomputer 510 evaluates and successively optimizes intervals D between trajectory points representing the target trajectory based on the evaluation function and thereby generates a trajectory point sequence, or a target trajectory, based on target intervals D.

The second trajectory point setting method may be regarded as a process of setting a target trajectory and intervals D between trajectory points at the same time.

The technical ideas described in the above embodiments may be used in any appropriate combination as long as they do not conflict with each other.

Although the present invention is specifically described above with reference to preferred embodiments, it is apparent to one skilled in the art that variations of the embodiments can be made based on the basic technical concept and the teachings of the present invention.

For example, trajectory point interval setting unit 513 may acquire, as information related to the driving environment of a driving road on which vehicle 100 travels, information related to weather, in other words, information related to a weather condition, such as sunshine, rain, and wind, and may set the intervals between trajectory points by using the acquired information related to weather as a setting condition.

Specifically, trajectory point interval setting unit 513 may decrease the intervals between trajectory points as the strength of the crosswind increases.

This is because the attitude of vehicle 100 is more likely to be disturbed and the performance in tracking a target trajectory is more likely to decrease as the strength of the crosswind increases.

Also, trajectory point interval setting unit 513 may decrease the intervals between trajectory points as the visibility decreases due to fog or rainfall.

Here, visibility indicates atmospheric visibility or the maximum distance at which an object can be clearly seen with the naked eye.

This is because the environment recognition accuracy (in other words, the measurement accuracy) of, for example, camera 340 is reduced in a driving environment in which the visibility is reduced due to fog, rainfall, etc.

In other words, weather conditions such as visibility, fog, and rainfall can be regarded as information related to the recognition accuracy of environment recognition unit 300.

Also, trajectory point interval setting unit 513 may set the intervals between trajectory points by using road information related to, for example, bridges, tunnels, urban area roads, and suburban roads as setting conditions represented by information related to the driving environment of a driving road on which vehicle 100 travels.

When vehicle 100 travels on a bridge or is at the exit of a tunnel, the attitude of vehicle 100 may be disturbed by the influence of, for example, wind.

Therefore, when vehicle 100 is traveling on a bridge or at the exit of a tunnel, to maintain the trajectory tracking performance, trajectory point interval setting unit 513 sets the intervals between trajectory points to a value less than the intervals between trajectory points that are set when vehicle 100 is traveling on a road before the bridge or inside of the tunnel.

Also, because the traffic volume of vehicles and pedestrians on urban area roads is generally greater than that on suburban roads and the driving environment on urban area roads is more complex and changes more frequently than on suburban roads, higher trajectory tracking performance is required on urban area roads compared to suburban roads.

Therefore, when vehicle 100 is traveling on an urban area road, trajectory point interval setting unit 513 sets the intervals between trajectory points to a value less than the intervals between trajectory points that is set when vehicle 100 is traveling on a suburban road. In other words, trajectory point interval setting unit 513 can decrease the intervals between trajectory points as the traffic volume of vehicles and/or pedestrians increases.

Also, trajectory point interval setting unit 513 may acquire, as information related to a motion state of vehicle 100, information on target acceleration/deceleration or actual acceleration/deceleration in the longitudinal direction of vehicle 100 and may decrease the intervals between trajectory points as the acceleration/deceleration increases.

In a state in which vehicle 100 rapidly accelerates or decelerates, because the attitude of vehicle 100 is likely to be disturbed, trajectory point interval setting unit 513 decreases the intervals between trajectory points to maintain the trajectory tracking performance.

REFERENCE SYMBOL LIST

100 . . . vehicle, 200 . . . vehicle control system, 300 . . . environment recognition unit, 400 vehicle state acquisition unit, 500 . . . vehicle control device, 510 . . . microcomputer (control unit), 600 . . . actuator unit

The invention claimed is:

1. A vehicle control device provided in a vehicle, the vehicle control device comprising:
   a control unit that outputs a calculation result based on input information,
   wherein the control unit is configured to:
      set a target travel course that is represented by trajectory points that are arranged at a predetermined travel distance, each of the trajectory points indicating a location at which the vehicle is to arrive; and
      output a control command that causes the vehicle to travel in accordance with information on a target trajectory, the information including a target speed and target acceleration set for each predetermined sampling time and the target travel course, and
   wherein the control unit:
      acquires a setting condition including at least one of information related to a driving environment of a driving road on which the vehicle travels and information related to a state of the vehicle, and
      variably sets, based on the setting condition, an interval between trajectory points that are set with the predetermined travel distance.

2. The vehicle control device according to claim 1, wherein the control unit acquires, as the setting condition, the information related to the driving environment.

3. The vehicle control device according to claim 2, wherein the control unit acquires, as the information related to the driving environment, information related to a road shape of the driving road.

4. The vehicle control device according to claim 3, wherein the control unit:
   acquires, as the information related to the road shape is, information related to a curvature of a travel course on which the vehicle travels; and
   decreases the interval between trajectory points set with the predetermined travel distance as the curvature increases.

5. The vehicle control device according to claim 3, wherein the control unit:
   acquires, as the information related to the road shape is, information related to a road width of the travel course on which the vehicle travels; and
   decreases the interval between trajectory points set with the predetermined travel distance as the road width decreases.

6. The vehicle control device according to claim 3, wherein the control unit:

acquires, as the information related to the road shape, information related to a curvature change of the travel course on which the vehicle travels; and decreases the interval between trajectory points set with the predetermined travel distance as the curvature change increases.

7. The vehicle control device according to claim 2, wherein the control unit:

acquires, as the information related to the driving environment, information related to a distance from an obstacle located ahead of the vehicle on the driving road on which the vehicle travels; and decreases the interval between trajectory points set with the predetermined travel distance as the distance from the obstacle decreases.

8. The vehicle control device according to claim 2, wherein the control unit acquires, as the information related to the driving environment, information related to a friction coefficient of a road surface of the driving road on which the vehicle travels; and decreases the interval between trajectory points set with the predetermined travel distance as the friction coefficient decreases.

9. The vehicle control device according to claim 2, wherein the control unit:

acquires, as the information related to the driving environment, information related to a distance from a leading vehicle traveling ahead of the vehicle on the driving road on which the vehicle travels; and decreases the interval between trajectory points set with the predetermined travel distance as the distance from the leading vehicle decreases.

10. The vehicle control device according to claim 2, wherein the control unit:

acquires, as the information related to the driving environment, information related to a relative speed of the vehicle relative to a leading vehicle traveling ahead of the vehicle on the driving road on which the vehicle travels; and decreases the interval between trajectory points set with the predetermined travel distance as the relative speed increases.

11. The vehicle control device according to claim 2, wherein the control unit:

acquires, as the information related to the driving environment, information related to a distance from the vehicle to each location on the driving road on which the vehicle travels; and decreases the interval between trajectory points set with the predetermined travel distance at a location closer to the vehicle.

12. The vehicle control device according to claim 1, wherein the control unit acquires, as the setting condition, at least one of information related to a distance from an obstacle located ahead of the vehicle on the driving road on which the vehicle travels, information related to a friction coefficient of a road surface of the driving road on which the vehicle travels, information related to a distance from a leading vehicle traveling ahead of the vehicle on the driving road on which the vehicle travels, information related to a relative speed of the vehicle relative to a leading vehicle traveling ahead of the vehicle on the driving road on which the vehicle travels, information related to a distance from the vehicle to each point on the driving road on which the vehicle travels, information related to a road width of the driving road on which the vehicle travels, information related to a curvature change of the driving road on which the vehicle travels, information related to a lateral jerk of the vehicle, and information related to a recognition accuracy of an environment recognition unit that is provided at the vehicle and acquires the information related to the driving environment of the driving road.

13. The vehicle control device according to claim 1, wherein the control unit acquires, as the setting condition, information related to a motion state of the vehicle that is the information related to the state of the vehicle.

14. The vehicle control device according to claim 13, wherein the control unit:

acquires, as the information related to the motion state of the vehicle, information related to a speed of the vehicle; and decreases the interval between trajectory points set with the predetermined travel distance as the speed of the vehicle decreases.

15. The vehicle control device according to claim 13, wherein the control unit:

acquires, as the information related to the motion state of the vehicle, information related to a lateral jerk of the vehicle; and decreases the interval between trajectory points set with the predetermined travel distance as the lateral jerk of the vehicle increases.

16. The vehicle control device according to claim 13, wherein the control unit:

acquires, as the information related to the motion state of the vehicle is, information related to a steering angle of the vehicle; and decreases the interval between trajectory points set with the predetermined travel distance as the steering angle increases.

17. The vehicle control device according to claim 1, wherein:

the vehicle includes an environment recognition unit that acquires the information related to the driving environment of the driving road; and the control unit:

acquires, as the setting condition, information related to a recognition accuracy of the environment recognition unit that is the information related to the state of the vehicle; and decreases the interval between trajectory points set with the predetermined travel distance as the recognition accuracy decreases.

18. The vehicle control device according to claim 1, wherein the control unit:

acquires multiple different setting conditions as the setting condition, and sets the interval between trajectory points based on the multiple different setting conditions.

19. A vehicle control method performed by a control unit provided in a vehicle, the vehicle control method comprising:

setting a target travel course that is represented by trajectory points that are arranged at a predetermined travel distance, each of the trajectory points indicating a location at which the vehicle is to arrive; and outputting a control command that causes the vehicle to travel in accordance with information on a target trajectory, the information including a target speed and target acceleration set for each predetermined sampling time and the target travel course, wherein

31 the setting the target travel course includes:

acquiring a setting condition including at least one of information related to a driving environment of a driving road on which the vehicle travels and information related to a state of the vehicle; and variably setting, based on the setting condition, an interval between trajectory points that are set with the predetermined travel distance.

20. A vehicle control system comprising:

an environment recognition unit that acquires information related to a driving environment of a driving road on which a vehicle travels;

a vehicle state acquisition unit that acquires information related to a state of the vehicle;

a control unit that outputs a calculation result based on input information; and an actuator unit, wherein the control unit is configured to:

set a target travel course that is represented by trajectory points that are arranged at a predetermined travel distance, each of the trajectory points indicating a location at which the vehicle is to arrive; and output a control command that causes the vehicle to travel in accordance with information on a target trajectory, the information including a target speed and target acceleration set for each predetermined sampling time and the target travel course, and wherein the control unit:

acquires a setting condition including at least one of the information related to the driving environment of a driving road on which the vehicle travels and the information related to the state of the vehicle, and variably sets, based on the setting condition, an interval between trajectory points that are set with the predetermined travel distance, and wherein the actuator unit controls a motion state of the vehicle based on the control command.

* * * * *